(12) United States Patent
Baumgart et al.

(10) Patent No.: US 7,660,068 B1
(45) Date of Patent: Feb. 9, 2010

(54) METHOD AND SYSTEM FOR PRE-CONTACT DETECTION AND ACTIVE DAMPING OF AIR BEARING VIBRATIONS IN A HARD DISK DRIVE

(75) Inventors: Peter M. Baumgart, San Jose, CA (US); John T. Contreras, Palo Alto, CA (US); Luiz Franca-Neto, Sunnyvale, CA (US); Bernhard E. Knigge, San Jose, CA (US); Richard Kroeker, Morgan Hill, CA (US); Gurinder P. Singh, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/212,739

(22) Filed: Sep. 18, 2008

(51) Int. Cl.
*G11B 21/02* (2006.01)
*G11B 15/64* (2006.01)

(52) U.S. Cl. .................................. 360/75; 360/234.4
(58) Field of Classification Search .................. None
See application file for complete search history.

(56) References Cited

U.S. PATENT DOCUMENTS

| 3,614,579 | A | 10/1971 | Fulton |
| 4,814,907 | A | 3/1989 | Goor |
| 5,991,113 | A | 11/1999 | Meyer et al. |
| 6,331,919 | B1 * | 12/2001 | Klaassen et al. ............ 360/46 |
| 7,016,139 | B2 | 3/2006 | Baumgart et al. |
| 7,193,806 | B1 | 3/2007 | Albrecht et al. |
| 7,199,960 | B1 | 4/2007 | Schreck et al. |
| 7,215,495 | B1 | 5/2007 | Che et al. |
| 7,215,500 | B1 | 5/2007 | Albrecht et al. |
| 7,233,451 | B2 | 6/2007 | Baumgart et al. |
| 7,277,252 | B1 | 10/2007 | Albrecht et al. |
| 7,330,336 | B2 | 2/2008 | Luo et al. |
| 2004/0165305 | A1 | 8/2004 | Nishiyama |
| 2007/0253090 | A1 | 11/2007 | Hirano et al. |
| 2008/0043355 | A1 | 2/2008 | Ota |

FOREIGN PATENT DOCUMENTS

JP 2003308670 10/2003

OTHER PUBLICATIONS

Gunn, J. B., "Magnetic Recording Head with Squeeze Bearing", *Delphion—IBM Technical Disclosure Bulletin*, (Jan. 1989),1 page.

* cited by examiner

*Primary Examiner*—K. Wong

(57) ABSTRACT

In a method of pre-contact detection and active damping of air bearing vibrations in a hard disk drive, a slider is isolated from ground. The slider is then capacitively coupled with a hard disk of the hard disk drive via a thermal fly-height control (TFC) heating element. An alternating current (AC) signal is applied to the slider via the TFC heating element to control the amplitude of the slider.

25 Claims, 16 Drawing Sheets

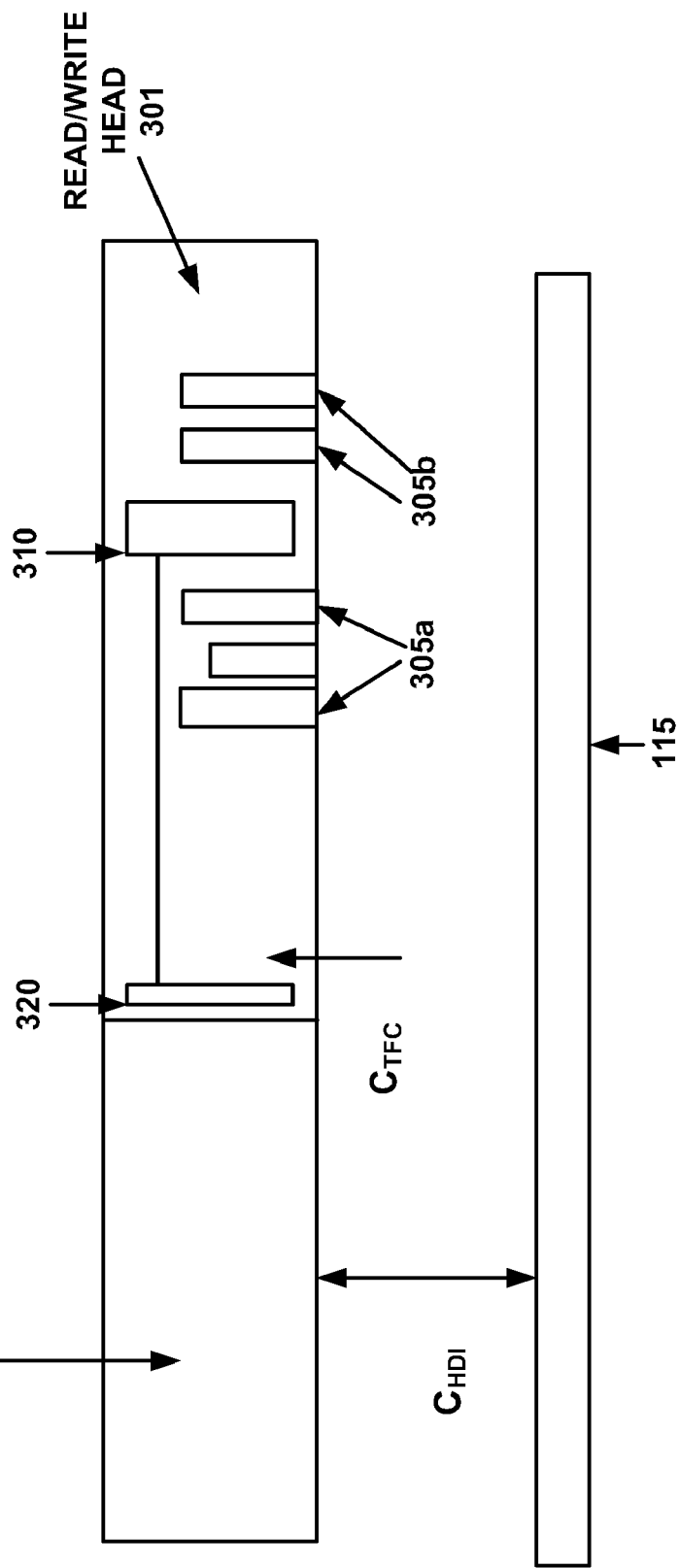

METHOD AND SYSTEM FOR PRE-CONTACT DETECTION AND ACTIVE DAMPING OF AIR BEARING VIBRATIONS IN A HARD DISK DRIVE

TECHNICAL FIELD

The present invention relates to the field of hard disk drive development, slider vibration control, and pre-contact detection between a slider body and disk of a hard disk drive.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm with a suspended slider is utilized to reach out over the disk. The slider includes a head assembly that has a magnetic read/write transducer or head for reading/writing information to or from a location on the disk. The complete head assembly, e.g., the suspension, slider, and head, is called a head gimbal assembly (HGA).

In operation, the hard disk is rotated at a set speed via a spindle motor assembly having a central drive hub. There are tracks at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), Moving Picture Experts Group audio layer 3 (MP3) players, and the like. For example, the original hard disk drive had a disk diameter of 24 inches. Modem hard disk drives are much smaller and include disk diameters of less than 2.5 inches. Advances in magnetic recording are also primary reasons for the reduction in size.

However, the small drives have small components with very narrow tolerances. Disk drive sliders are designed to fly in very close proximity to the disk surface. For instance, in some systems the slider may be designed to fly only three to five nanometers above the disk surface. In a system with such close tolerances, components can be subject to van der Waals, Meniscus, electrostatic, spindle motor charge up, and contact potential forces. These forces are due to a variety of causes, such as: the molecular attraction of components in very close proximity; adhesive friction caused by contact between the slider and the lubricant on the disk; the build up of electrical potential between the disk and the slider caused by the rotating disk surface (tribo-charging); the build up of electrical potential in motor bearings (tribo-charging); potential difference that exists between two different metals (different Fermi levels of slider and disk material); and impacts between the slider and disk surface. These forces alone, and in combination, create bouncing vibrations of the slider.

Bouncing vibrations of the slider are undesirable because they can cause media damage. Bouncing vibrations also cause variations in the magnetic spacing between the head element and media that are likely to cause data errors—both hard errors during writing and soft errors during reading. The bouncing vibration that causes the most concern occurs in the second pitch mode of the slider. In some hard disk drives, this 'Pitch 2' mode vibration is typically around 200 kHz (kilo Hertz) and is incoherent.

One approach to reducing these bouncing vibration problems is to use electrostatic fly height control in which a voltage applied to the slider causes the fly-height to vary. This sort of active servo control of the slider can work well, but is difficult to implement in a functioning hard disk drive because it is complex and requires very precise measurements regarding fly height. Furthermore, some methods detect contact between the slider body and hard disk and measure the difference in fly-height as voltage to the slider varies. However, contact between the slider body and the hard disk can damage the slider body.

SUMMARY OF THE INVENTION

In a method of pre-contact detection and active damping of air bearing vibrations in a hard disk drive, a slider is isolated from ground. The slider is then capacitively coupled with a hard disk of the hard disk drive via a thermal fly-height control (TFC) heating element. An alternating current (AC) signal is applied to the slider via the TFC heating element to control the amplitude of the slider.

BRIEF DESCRIPTION OF THE DRAWINGS

FIGS. 3A 3B, 3C, 3D, and 3E show components of an example suspension, slider, and disk, in accordance with embodiments of the present invention.

DETAILED DESCRIPTION

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with a brief overview of disk drive operation, focusing on the slider as it is utilized in the disk drive. Some of the forces that contribute to slider bounce vibrations will be discussed. Embodiments of an apparatus and method of pre-contact detection and active damping of air bearing vibrations in a hard disk drive in accordance with the present invention will then be described.

Figure 1:
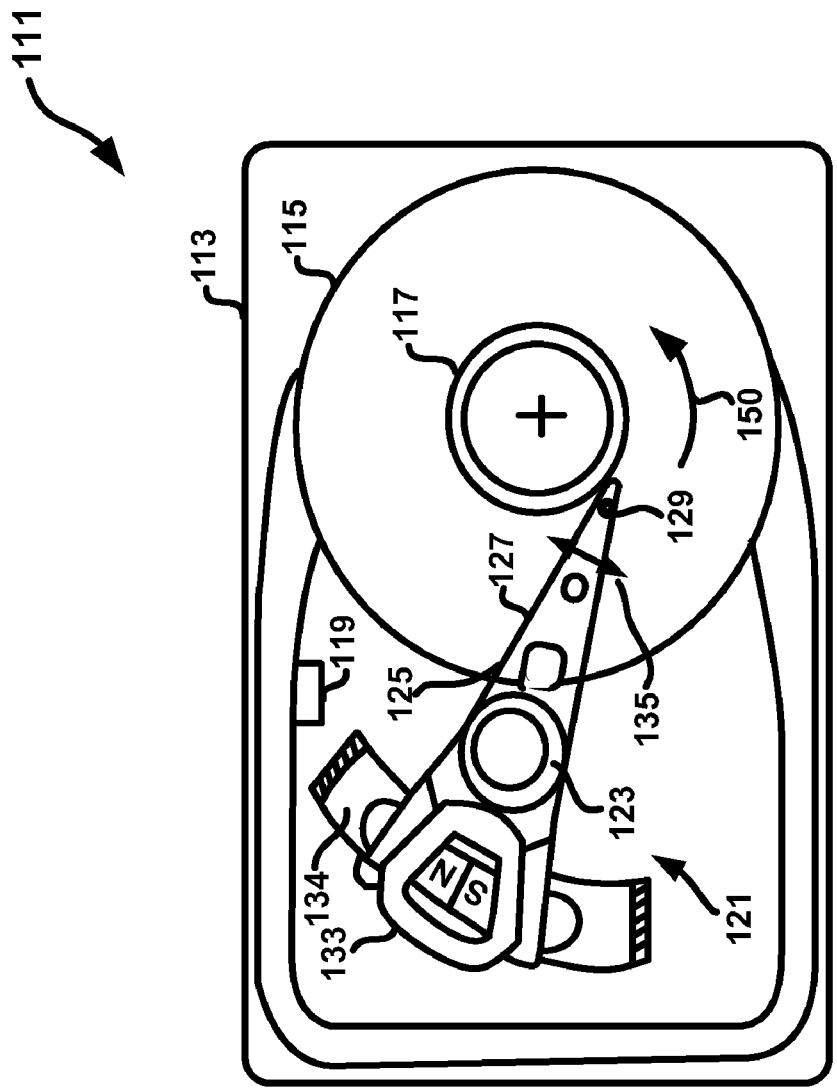
FIG. 1 is a schematic top plan view of a hard disk drive, in accordance with one embodiment of the present invention.

FIG. 1 shows a schematic drawing of one embodiment of an information storage system comprising a magnetic hard disk file or drive 111 for a computer system. Drive 111 has an outer housing or base 113 containing a disk pack having at least one media or magnetic disk 115. A spindle motor assembly having a central drive hub 117 rotates the disk or disks 115 in the direction shown by arrow 150. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown in FIG. 1, each arm 125 has extending from it at least one cantilevered integrated lead suspension (ILS) 129. The ILS 129 may be any form of lead suspension that can be used in a data access storage device, such as a hard disk drive (HDD). The slider 230 (see FIG. 2) is usually bonded to the end of ILS 129, both of which are attached to a suspension 127. The slider 230 (see FIG. 2), in this embodiment, is electrically isolated from suspension 127 due to the high impedance (e.g., greater than 10,000 Ohms) of the connection 231 between these components. In one embodiment, high impedance glue or other high impedance methods of coupling slider 230 with suspension 127 is used. For example, in one embodiment polyimide is used in the connection 231. In this example, wire lines (not shown) may communicatively couple components of slider 230 with hard disk drive 111. The level of integration containing the slider, suspension, ILS, and read/write head (not shown) is called the head gimbal assembly (HGA).

The ILS 129 has a spring-like quality, which biases or presses the air-bearing surface of the slider 230 (see FIG. 2) against the disk 115 to cause the slider 230 (see FIG. 2) to fly at a precise distance from the disk 115. The ILS 129 has a hinge area that provides for the spring-like quality, and a flexing interconnect that supports read and write traces and electrical connections through the hinge area. A voice coil 133, free to move within a conventional voice coil motor magnet assembly 134 (top pole not shown), is also mounted to arms 125 opposite the head gimbal assemblies. Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and always move in unison with one another, unless drive 111 uses multiple independent actuators (not shown) wherein the arms can move independently of one another.

Figure 2:
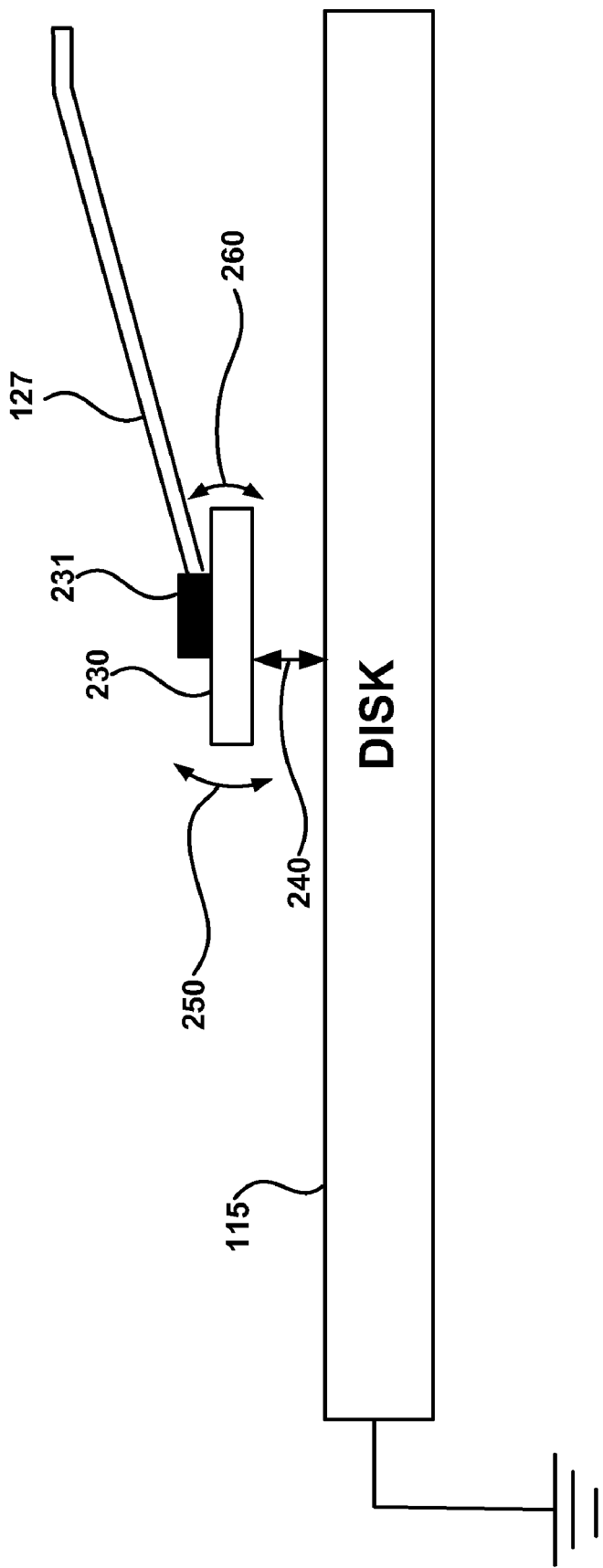
FIG. 2 is a side view of an exemplary suspension with attached slider, suspended over a disk, in accordance with one embodiment of the present invention.

FIG. 2 shows a side view of an exemplary suspension 127 with a slider 230 attached to the end of it. Slider 230 is shown suspended by suspension 127 over the surface of a disk 115, and is designed to fly in close proximity to the surface of disk 115. The arrow 240 represents the fly height of slider 230, which can be as little as three nanometers above the surface of disk 115. As previously explained, suspension 127 is electrically isolated from slider 230 due to the high impedance exhibited by connection 231. This prevents dissipation of voltages applied to slider 230 from dissipating via suspension 127.

Small drives in use today have small components with very narrow tolerances. In some systems, slider 230 may be designed to fly only three nanometers above the surface of disk 115. In other hard disk drives, the aim may be to actually put slider 230 into contact with the surface of disk 115. In disk drives with such close tolerances, components such as slider 230 can be subject to van der Waals, meniscus, electrostatic, spindle motor charge up, contact potential, and impact forces.

These forces are due to a variety of causes, such as: the molecular attraction between components in very close proximity; adhesive friction caused by contact between slider 230 and the lubricant on disk 115; the build up of electrical potential between disk 115 and slider 230 caused by the rotating surface of disk 115 (tribo-charging); the build up of electrical potential at the motor bearings leading to a charged disk 115 (tribo-charging); the potential difference that exists between two dissimilar materials (i.e. different Fermi-levels of slider and disk material), and friction and contact between slider 230 and the surface of disk 115. These forces alone, and in combination, create bouncing vibrations in slider 230 that can cause media damage and can also cause data loss during read and write operations. Air bearing vibrations are a type of bounce vibrations.

Air bearing vibrations act on the slider in several modes, called Roll, first Pitch mode, and second Pitch mode vibration. In today's disk drives, the frequency range that includes the particular air bearing vibration modes of interest in the present invention is between approximately 50 kHz and approximately 500 kHz. One embodiment of the present invention is used to actively counteract bouncing vibrations in the Pitch 2 mode. These Pitch 2 mode vibrations create problems with read/write errors and media damage. In FIG. 2, arrows 250 and 260 show the direction of up/down motion imparted to a slider 230 experiencing Pitch 2 mode vibrations. The up/down motion (250 and 260) has a velocity that can be measured. The up and down motions (250 and 260) of slider 230 typically peak at a frequency of around 200 kHz. With a slider 230 fly height 240 of three nanometers above the surface of disk 115, a goal might be, for instance, to keep bounce vibrations to plus or minus one nanometer of dynamic modulation of the body of slider 230. This is very difficult with passive damping when a single force, such as friction can cause bounce vibrations of twenty to thirty nanometers.

Figure 3A:
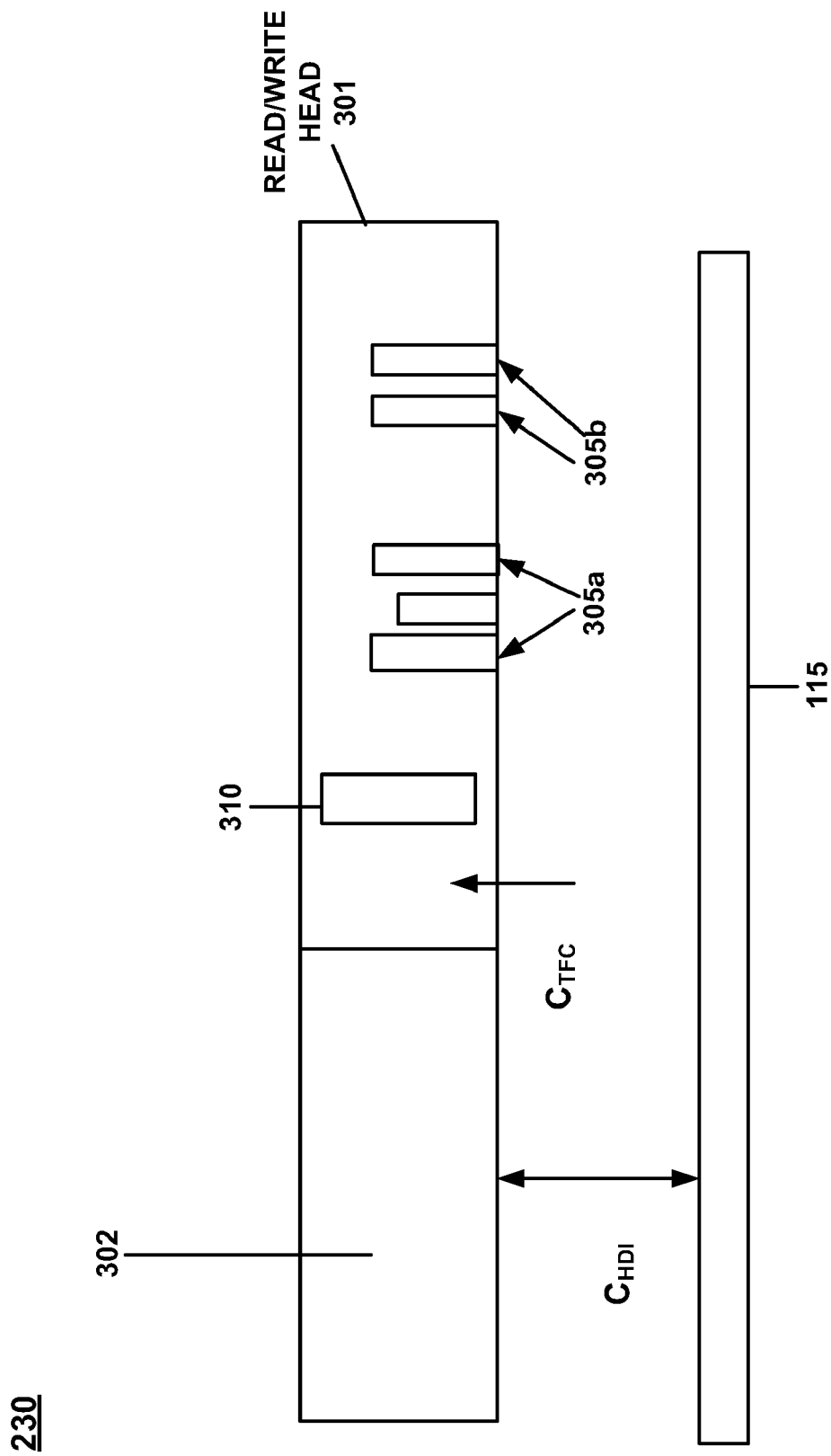

FIGS. 3A, 3B, 3C, 3D, and 3E show components of an example slider, and disk, in accordance with embodiments of the present invention. In FIG. 3A, slider 230 comprises a read/write head 301 which is coupled with a slider body 302. Typically, read/write head 301 is comprised of a non-conductive material such as $Al_2O_3$. Also shown in FIG. 3A are reader shields 305a and the writer poles 305b. Also shown in FIG. 3A is a thermal fly-height control (TFC) heating element. One method for controlling the fly height of read/write head 301 uses TFC technology. It is known in the art that as a write current is applied to the write element of a slider, the write element heats up and expands. This causes the read/write elements to protrude toward the disk and reduce fly-height. However, due to the reduced fly height exhibited in some hard disk drives, contact between slider 230 and disk 115 can occur, particularly when air bearing vibrations are also causing changes to the fly height of slider 230. In an embodiment of the present invention, a heating element (e.g., TFC heating element 310) is disposed within head 301 of slider 230. A current applied to TFC heating element 310 causes the surrounding material of head 301 to expand and move the read/write elements of head 301 toward disk 115. Thus, the fly height of read/write head 301 can be adjusted independent of other voltages applied to slider 230 using TFC heating element 310. TFC heating elements are often used to maintain a stable fly height for the read and write element relative to the disk. For example, the voltage supplied to TFC heating element 310 can be decreased over time as data is written to disk 115 to maintain a stable fly height.

As shown in FIG. 3A, slider body 302 is coupled with read/write head 301. Typically, slider body 302 comprises a conductive material such as $Al_2O_3$—TiC. In embodiments of the present invention, an alternating current (AC) signal is sent to TFC heating element 310. This AC signal is sent via the line (not shown) which supplies the DC voltage to TFC heating element 310 when used to vary the fly height of the write element as described above. In one embodiment, because TFC heating element 310 has a relatively slow time constant (e.g., approximately 1 ms to 500 µs), it is not responsive to higher frequency AC signals. In other words, there is a lag between the time TFC heating element 310 receives a voltage and the time it takes TFC heating element 310 to cause the surrounding material of read/write head 301 to expand and move the read/write elements of head 301 toward disk 115. The result is that while TFC heating element 310 will cause expansion of read/write head 301, it is not responsive to the individual electrical pulses of an AC signal which is at a higher frequency than its time constant. However, due to the AC signal sent to TFC heating element 310, the fly height of slider 230 will vary due to electrostatic forces.

Figure 10:
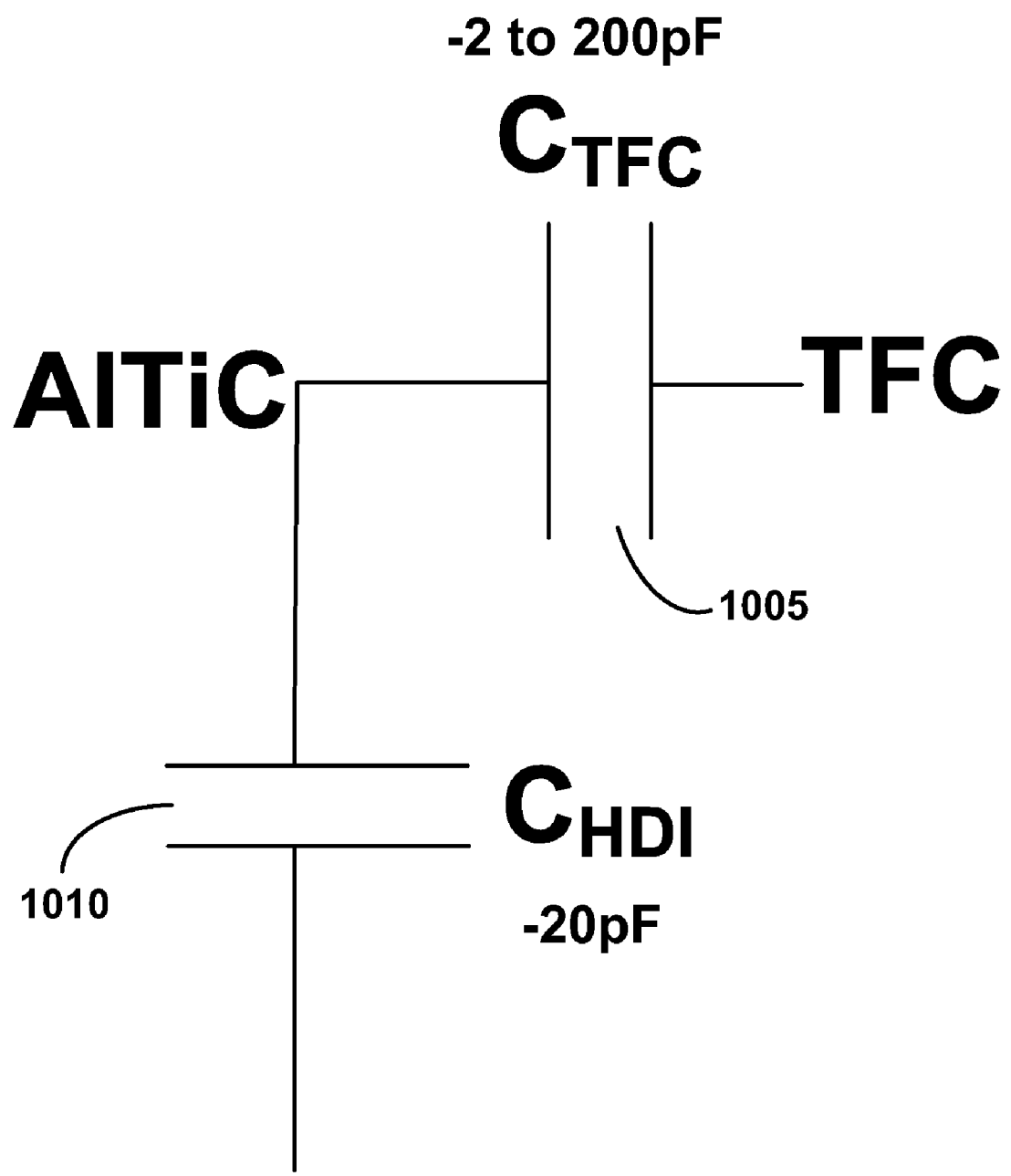
FIG. 10 shows components of an example capacitive circuit in accordance with an embodiment of the present invention.

Because slider 230 is electrically isolated from suspension 127 using a high impedance connection, a voltage applied to slider 230 cannot dissipate out of slider 230 through suspension 127. Thus, a capacitive circuit is formed between slider 230 and disk 115 using the AC signal applied to TFC heating element 310. For example, referring now to FIG. 10, a first capacitive coupling exists between TFC heating element 310 and slider body 302. Because the AC signal applied to TFC heating element 230 is separated from the conductive material of slider body 302 by the non-conductive material of read/write head 301, a first capacitive coupling 1005 is formed between them. As shown in FIG. 10, the capacitance of capacitive coupling 1005 is approximately 2 to 200 pico farads. Additionally, a second capacitive coupling 1010 is formed across the head/disk interface (HDI) which separates slider 230 and disk 115. As shown in FIG. 10, the capacitance of capacitive coupling 1010 is approximately 20 pico farads. Thus, first capacitive coupling 1005 and second capacitive coupling 1010 comprises a part of a capacitive circuit used in embodiments of the present invention. As will be discussed in greater detail below, pre-contact detection and active damping of air bearing vibrations in a hard disk drive of the present invention utilize first capacitive coupling 1005 and second capacitive coupling 1010.

Figure 3B:
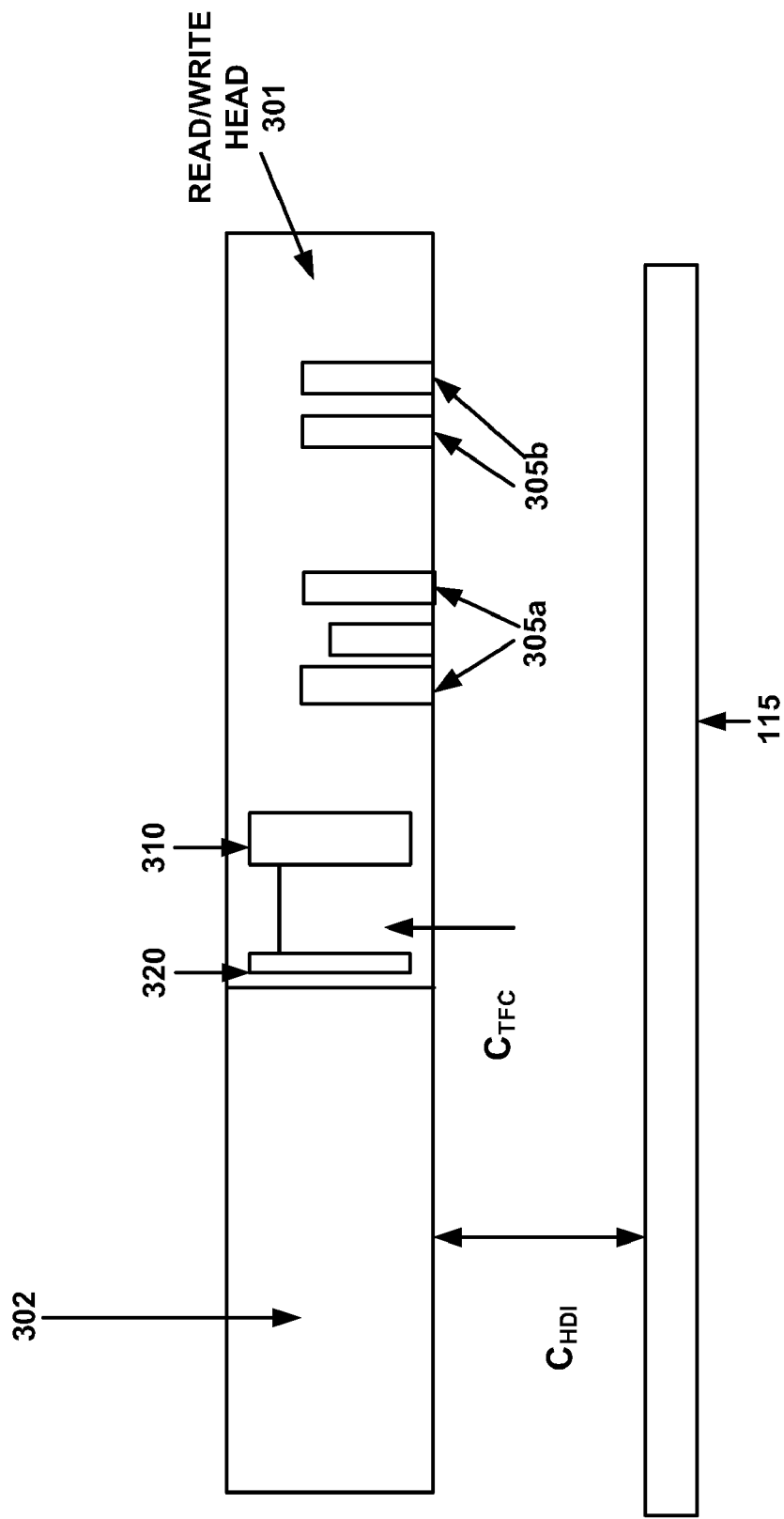

FIG. 3B shows slider body 230 and disk 115 in accordance with another embodiment of the present invention. For the purpose of brevity, elements of FIG. 3B which were discussed above with reference to FIG. 3A will not be repeated. In FIG. 3B, an antenna element 320 is coupled with TFC heating element 310. In one embodiment, antenna element 320 comprises a capacitor. It is noted that in one embodiment, antenna element 320 is coupled with the line (not shown) which supplies the DC voltage to TFC heating element 310 when used to vary the fly height of the write element as described above. In embodiments of the present invention, antenna element 320 increases the capacitive coupling with slider body 302 which also results in increased capacitance sensitivity. Furthermore, the use of antenna element 320 can increase the efficiency to slider flying height modulation and/or contact. It is noted that in FIG. 3B, antenna element 320 is coupled with the line (not shown) which supplies the DC voltage to TFC heating element 310 when used to vary the fly height of the write element as described above.

FIG. 3C shows slider body 230 and disk 115 in accordance with another embodiment of the present invention. Again, for the purpose of brevity, elements of FIGS. 3A and 3B which were discussed above will not be repeated. In FIG. 3C, TFC heating element 310 has been moved to a position between the read head and write head of slider 230. Thus, TFC heating element is further from slider body 302. It is sometimes desirable to move the location of TFC heating element 310 to change the protrusion profile exhibited when TFC heating element 310 is used. As a result, a weaker capacitive coupling would result. However, using antenna element 320, the capacitive coupling is maintained even though TFC heating element 310 has been moved farther from slider body 302. In other words, antenna element 320 facilitates a greater capacitive coupling with slider body 302 even though TFC heating element has been moved further away. It is noted that in FIG. 3C, antenna element 320 is coupled with the line (not shown) which supplies the DC voltage to TFC heating element 310 when used to vary the fly height of the write element as described above. As described above with reference to FIG. 3B, in one embodiment antenna element 320 comprises a capacitor.

Figure 3D:
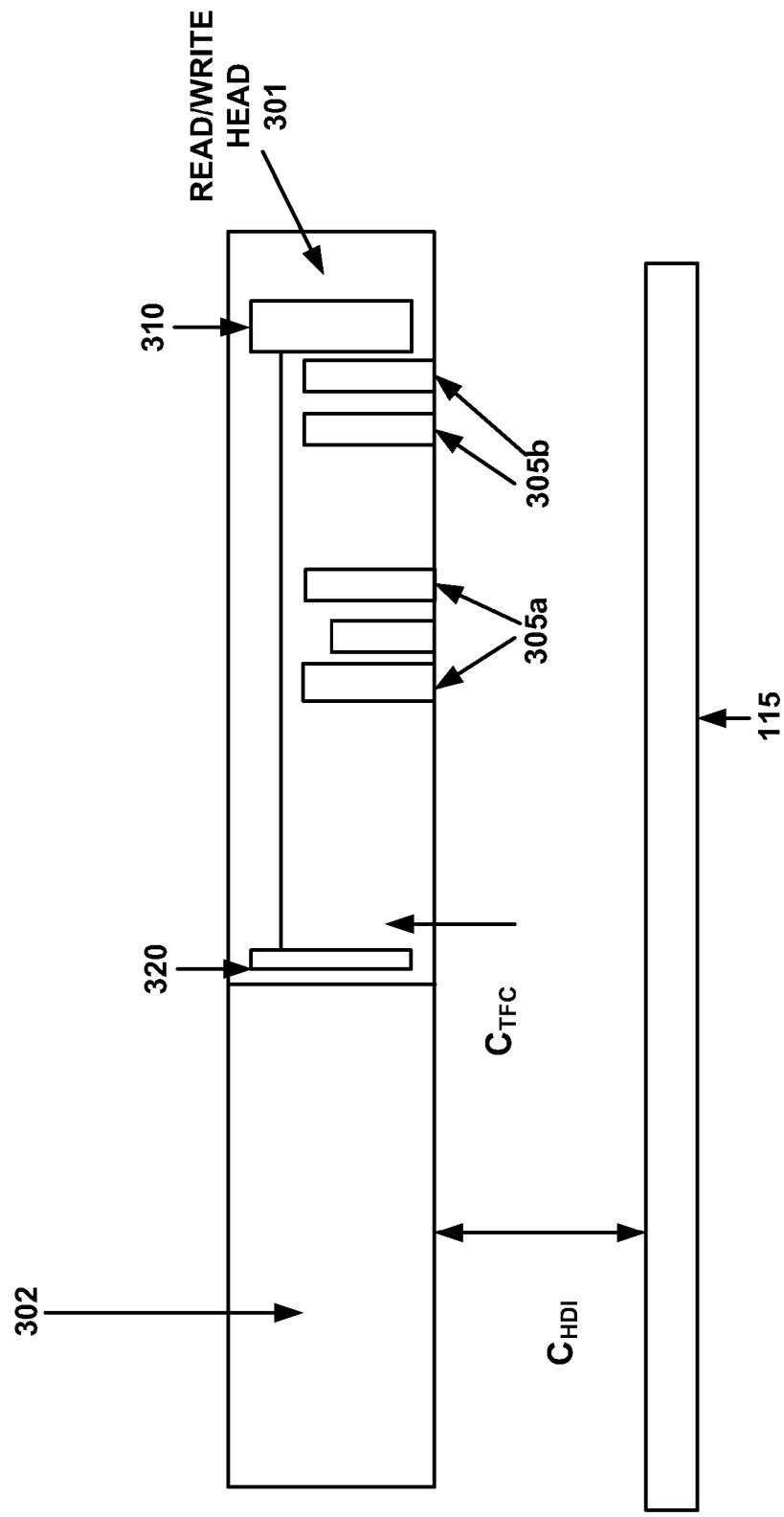

FIG. 3D shows slider body 230 and disk 115 in accordance with another embodiment of the present invention. Again, for the purpose of brevity, elements of FIGS. 3A, 3B, and 3C which were discussed above will not be repeated. In FIG. 3D, TFC heating element 310 has again been moved to the opposite side of read/write head 301 relative to slider body 302. In the example of FIG. 3D, TFC heating element has been moved to the far side of read/write head 301 relative to slider body 302 and in now disposed on the far side of the write head. As shown in FIG. 3D, the location of TFC heating element 310 has been moved to change the protrusion profile exhibited when TFC heating element 310 is used. It is noted that in FIG. 3D, antenna element 320 is coupled with the line (not shown) which supplies the DC voltage to TFC heating element 310 when used to vary the fly height of the write element as described above. As described above with reference to FIG. 3B, in one embodiment antenna element 320 comprises a capacitor.

Figure 3E:
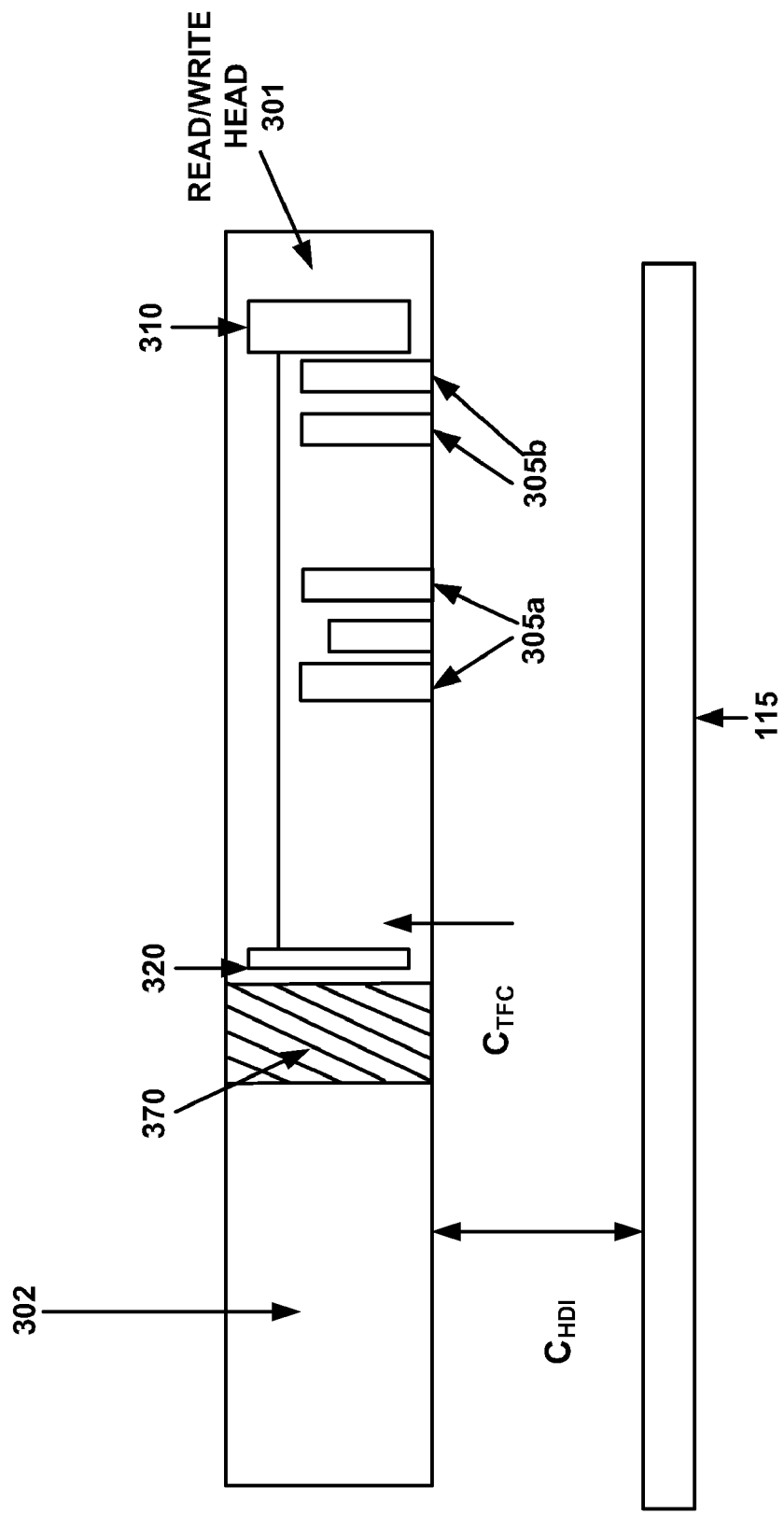

FIG. 3E shows slider body 230 and disk 115 in accordance with another embodiment of the present invention. For the purpose of brevity, elements of FIG. 3E which were discussed above with reference to FIGS. 3A, 3B, 3C, and 3D will not be repeated. In FIG. 3E, an antenna element 320 is coupled with TFC heating element 310. Furthermore, in the embodiment of FIG. 3E, a layer of high dielectric material 370 is disposed between slider body 302 and read/write head 301. In accordance with an embodiment of the present invention, layer 370 is used to improve the capacitive coupling between antenna element 320 and slider body 302. For example, in one embodiment, layer 370 comprises a layer of $TiO_2$ which has a dielectric constant of approximately or $\in$=100. It is noted that embodiments in accordance with the present invention are not limited to the use of $TiO_2$ in layer 370. Layer 370 can be deposited on slider body 302 during fabrication by sputtering a layer of $TiO_2$ on top of slider body 302 and then depositing the material comprising antenna element 320 on top of layer 370. It is noted that in FIG. 3E, antenna element 320 is coupled with the line (not shown) which supplies the DC voltage to TFC heating element 310 when used to vary the fly height of the write element as described above. As described above with reference to FIG. 3B, in one embodiment antenna element 320 comprises a capacitor. It is noted that layer 370 can be used in conjunction with the embodiments shown in FIGS. 3A, 3B, 3C and 3D as well to increase the capacitive coupling with slider body 302. It is further noted that in accordance with an embodiment of the present invention, antenna element 320 can receive the AC signal from a separate line than the line which supplies a DC voltage to TFC heating element 310. This facilitates using the capacitive coupling between antenna element 310 and slider body 302 independent of the operation of TFC heating element 310. Thus, a voltage applied to antenna element 320 will be isolated from TFC heating element 310 and will not significantly change the fly-height of slider 230 due to thermally-driven protrusion.

Figure 4:
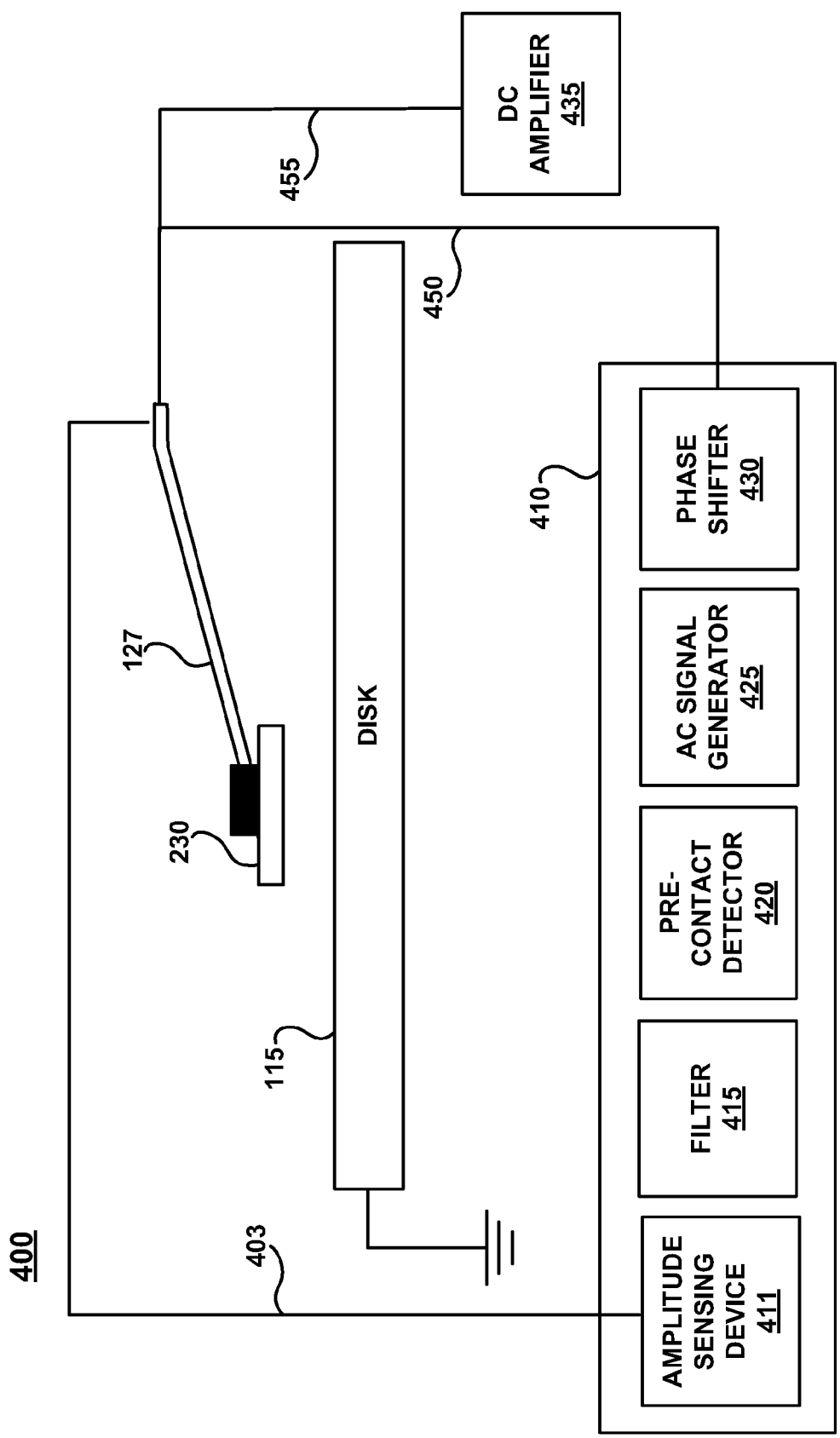
FIG. 4 is a block diagram of an example system for providing pre-contact detection and active damping of air bearing vibrations in a hard disk drive, in accordance with one embodiment of the present invention.

FIG. 4 shows a side view of an example system 400 for providing pre-contact detection and active damping of air bearing vibrations in a hard disk drive in accordance with one embodiment of the present invention. The disk 115 is attached to ground. As discussed above, the slider 230 is electrically isolated from ground and/or from the suspension 127 that it is attached to. Again, this electrical isolation can be accomplished in a variety of ways, such as by providing a high impedance material between the slider 230 and the suspension 127. In one embodiment of the present invention, portions of the suspension 127 can be partially covered with a polyimide film and/or high impedance glue. The polyimide film prevents direct contact between the suspension 127 and the body of the slider 230, and simultaneously allows isolation of the slider 230 from ground. In one embodiment of the present invention, the entire suspension is isolated from ground, and the slider may or may not be electrically isolated from the suspension.

FIG. 4 also shows a fly height modulation amplitude sensing device 411 that is electrically coupled with a signal processor 410 and with slider 230 via connection 403. Since the slider is electrically isolated from ground, any AC signal in the frequency range near the air bearing range and suspension range (ie from 10 kHz to 300 kHz) that is send to the heater coil/antenna like structure will cause slider modulation. Ie, the slider/disk acts like a capacitor. Slider modulation can be excited by applying an AC signal but inversely, the signal processor 410 may also be used to detect slider modulation. The slider/disk interface capacitance varies when the slider is modulating which can be measured thru the heater/antenna structure—this would then be a method to detect contact and or slider modulation. Slider fly height modulation can also be measured using the read-back signal [previous patents and publications on this topic exist]. Do to so, amplitude demodulation and/or low pass filtering of the read-back signal should be performed. The slider modulation as measured by the read-back signal can be used as an input signal to the heater/antenna structure to excite or damp the slider fly height modulation. Excitation of air bearing modes occur when the input (read back signal) and output (heater/antenna structure) signals are in phase. Damping of air bearing modes occur when the input and output signal are out of phase.

Pre-contact detection can be achieved by purposely causing air bearing vibrations (by applying an AC signal to the heater/antenna structure) and simultaneously increasing the heater power (DC power) to reduce clearance between slider and disk. Prior to contact, the AC modulation amplitude will decrease which could be measured from the read-back signal or the capacitive signal. (see FIG. 5B)

In one embodiment, amplitude sensing device 411 generates a modulation amplitude signal based upon a readback signal generated by slider 230 in which readback signal amplitude vs. spacing is described by the Wallace spacing equation which can be used to determine the clearance of slider 230 relative to disk 115. More specifically, the amplitude of the readback signal varies exponentially to the fly height of slider 230. Thus, when slider 230 is closer to disk 115 (e.g., at a reduced fly height), the amplitude of the readback signal will be greater than when slider 230 is further away from disk 115. In another embodiment, a change in capacitance between slider 230 and disk 115 is detected in response to a change in the fly height of slider 230 above disk 115. For example, in one embodiment, slider 230 is electrically isolated from suspension 127. As a result, system 400 effectively forms a capacitive loop and the fly height of slider 230 will vary in response to changes in the voltage exhibited at the slider/hard disk interface. A change in capacitance (measured at the slider/hard disk interface) can be detected and used to determine the change in the fly height of slider 230. A capacitive sensing device can be advantageous in some situations because it can detect bouncing vibrations that are not measured through the means of readback signal amplitude variations (i.e. during write operations). This allows the separation of mechanical vibrations from magnetic noise and head instability. Thus, using either a capacitive sensing device, or a magneto-resisitive sensing device, amplitude sensing device 411 can generate a modulation amplitude signal which is a measure of the up down motion of the slider in the Pitch 2 mode, as described by the arrows (250 and 260) in FIG. 2.

Signal processor 410 develops a voltage in response to changes in the modulation amplitude signal generated by sensing device 411, and applies it to slider 230 via a feedback line 450. In the embodiment of FIG. 4, feedback line 450 is coupled with line 455 which supplies a DC voltage from DC amplifier 435 and TFC heating element 310 and/or antenna element 320. In one embodiment of the present invention, line 455 is embedded in suspension 127, but electrically isolated from suspension 127 by some means such as the use of polyimide coatings, then routed across suspension 127 to slider 230. In one embodiment, line 450 is electrically coupled with a separate electrical connection from line 455 so that a voltage applied to antenna element 320 can be provided independent of a voltage applied to TFC heating element 310. Although signal processor 410 is shown as a single block (with internal functions) for simplicity, it should be understood that it could comprise several smaller circuits, or a larger circuit(s), to accomplish each of its internal functions. For instance, a microprocessor or digital signal processor can be used to perform all of the functions of signal processor 410 in a single device.

In FIG. 4, a modulation amplitude signal from amplitude sensing device 411 enters a filter 415. The filtering 415 is done to retain the portion of the modulation amplitude signal that contains vibrations in the air bearing range of the slider. For example, the Pitch 1 mode is typically seen at about 140 kHz, the Pitch 2 mode is typically seen at around 200 kHz, and the roll mode is typically seen at around 90 kHz. Capturing the bounce vibrations in the air bearing range, particularly the Pitch 2 mode vibrations, is the point of filter 415. In one embodiment of the present invention, filtering 415 is done with a high pass filter, keeping the portion of the signal above approximately 50 kHz. In another embodiment of the present invention, the modulation amplitude signal generated by amplitude sensing device 411 is filtered 420 through a band pass filter to keep the portion of the signal between about 50 kHz and about 500 kHz. It is noted that it is important to adjust the filter 415 specifications to substantially capture the frequency range that contains the vibrations of the Pitch 2 mode. In another embodiment, filter 415 is omitted from signal processor 410.

Capturing the Pitch 2 mode frequency range is the main concern of the filtering 415, since vibrations in this mode disturb the flying height, or spacing of slider 230 above disk 115. In some embodiments of the present invention, filtering 415 also captures vibrations in the Roll mode and Pitch 1 mode, though these generally have little impact on the fly height of the slider, simply to ensure complete capture of the Pitch 2 frequency range. Frequencies outside the range of a particular slider's Pitch 2 mode frequency range are kept only if they have a suitable phase shift so as not interfere with Pitch 2 damping when the vibration signal is later adjusted in amplitude and coupled with the slider 230. In one embodiment of the present invention, if it is determined that other frequencies near the Pitch 2 mode negatively impact damping if they are allowed through, then a narrower filtering range, passing substantially only the Pitch 2 mode frequency band is used in filter 415. For instance, in one embodiment of the present invention, in a slider with a Pitch 2 frequency centered at around 200 kHz, a bandpass filter capturing the range from about 150 kHz to about 250 kHz is used for filter 415.

In the embodiment of FIG. 4, signal processor 410 further comprises a pre-contact detector 420. In one embodiment, pre-contact detector 420 is for identifying a pre-contact condition between slider 230 and disk 115. As will be explained in greater detail below, in one embodiment a pre-contact condition is identified in response to determining that the modulation amplitude signal output by amplitude sensing device 411 decreases as power supplied to slider 230 is increased.

In the embodiment of FIG. 4, signal processor 410 further comprises an alternating current (AC) signal generator 425. In one embodiment, AC signal generator 425 is for generating an AC signal which is used in pre-contact detection between slider 230 and disk 115. In one embodiment, the frequency of the AC signal generated by AC signal generator 425 matches (or is close to it) the frequency of the air bearing vibrations of slider 230. For example, if the frequency of the air bearing vibrations of slider 230 is 200 kHz, the frequency of the AC signal generated by AC signal generator 425 is also 200 kHz, ie, due to contact potential offsets between slider and disk, both $1^{st}$ and $2^{nd}$ harmonic signals are detected in the readback signal and/or the capacitive signal. In another embodiment, the frequency of the AC signal generated by AC signal generator 425 is modulated in proportion to the frequency of the air bearing vibrations of slider 230. For example, in one embodiment if the frequency of the air bearing vibrations of slider 230 is 200 kHz, the frequency of the AC signal generated by AC signal generator 425 is 100 kHz. This is possible because a 2× capacitive coupling via TFC heating element 310, slider body 302 and disk 115 (ie, only the $2^{nd}$ harmonic signal is detected if there is no contact potential differences and/or if there is no DC voltage applied to the slider/disk interface). This causes a second harmonic electrostatically unless there is a potential difference, in which case a 100 kHz harmonic will be exhibited as well. Thus, the frequency of the AC signal generated by AC signal generator 425 can be in proportion to a vibration frequency of slider 230 in one embodiment of the present invention by adding a DC signal to the slider body.

Additionally, the AC signal generated by AC signal generator 425 can be used to control the air bearing vibrations of slider 230. In one embodiment, controlling the air bearing vibrations of slider 230 comprises active damping of the Pitch 2 mode vibrations of slider 230. In another embodiment, control of the air bearing vibrations of slider 230 comprises excitation of the air bearing vibrations to assist in pre-contact detection between slider 230 and disk 115, or for active stiffening of suspension 127. As an example, an AC voltage of 0.2-0.3 volts can modulate the amplitude of vibrations of slider 230 by 0.5 nanometers depending upon the distance of slider 230 from disk 115. In one embodiment, AC signal generator 425 can be configured to generate a signal at 200 kHz to match the frequency of the Pitch 2 mode vibrations of slider 230. Unlike other solutions which apply a signal to the slider 230 via a dedicated signal pathway, embodiments of the present invention utilize the existing signal pathway which couples TFC heating element 310 with hard disk drive 111. Because embodiments of the present invention utilize an existing line coupled with TFC heating element 310, there is no requirement for an extra line to create a capacitive circuit using TFC heating element 310. As a result, a savings in fabrication cost is realized in embodiments of the present invention. Furthermore, embodiments of the present invention can be implemented in hard disk drives that are currently in production. Furthermore, embodiments of the present invention can be used in active dampening of air bearing vibrations, and active stiffening of suspension 127, which permits a reduced fly height of slider 230 relative to disk 115. This facilitates greater data densities and promotes less damage to read/write head 301. Furthermore, embodiments of the present invention can be utilized for pre-contact detection between slider 230 and disk 115 as well as non-magnetic based contact detection between slider 230 and disk 115.

Some embodiments of the present invention also incorporate a phase-shifter 430 into signal processor 410. In FIG. 4, phase-shifter 430 is electrically coupled with the output of AC signal generator 425 and receives an AC signal as its input. It can be desirable to incorporate a phase-shifter 430 for several reasons. First, phase-shifter 430 gives a means to optimize control of the AC signal that is eventually fed back TFC heating element 310 and/or antenna element 320 over feedback line 450. In one embodiment, phase shifter 430 variably shifts the phase of a signal output by AC signal generator 425. For example, it may be desirable to maximize the vibrations of slider 230 in some situations (e.g., in pre-contact detection), while it is desirable to minimize (e.g., in active damping) the vibrations of slider 230 in other situations. Thus, in one embodiment, phase shifter 430 can dynamically shift the phase difference between an input signal and an output signal. Maximum excitation of bounce vibrations in the air bearing range occurs if the AC voltage is applied in phase with the air bearing vibrations of slider 230. This is accomplished with a zero degree phase difference in the vibrations of slider 230 (e.g., the modulation amplitude signal) and the AC signal sent to the TFC heating element 310 and/or antenna element 320 over feedback line 450 which is output by AC signal generator 425. When there is a zero degree phase difference in the vibrations of slider 230 and an AC signal output by AC signal generator 425, a greater attractive force is exhibited between them which increases the amplitude of the air bearing vibrations of slider 230. The attractive force is due to the fact that when materials (e.g., slider body 302 and disk 115) are made into a parallel plate capacitor (e.g., second capacitive coupling 1010 of FIG. 10), equal and opposite surface charges form on each material. The voltage formed between the plates of the capacitor from these charges is referred to as a "contact potential" and is in part dependant on the material properties of slider and disk overcoats. Typically, the contact potential in current disk drives is about 0.4V. This means a 'linearization' of the capacitive force between slider and disk occurs, ie both first and $2^{nd}$ harmonic signal of an AC signal can be observed in the readback signal or capacitive signal. The following equation describes the capacitive force between slider and disk subject to an AC and DC voltage.

$$F_{cap} = \frac{\varepsilon_0 \varepsilon_r A}{2d^2}(V_{AC}\sin\omega t + V_{DC} + V_{contact})^2,$$

where $\varepsilon$=dielectric permability, A=area of slider, d=slider disk spacing, Vac=amplitude of AC signal, $\omega$=frequency of AC modulation, Vdc=applied DC voltage to slider body and Vcontact=contact potential between slider and disk. The equation above can be rewritten in the following fashion:

$$F_{cap} = \frac{\varepsilon_0 \varepsilon_r A}{4d^2}[2 \cdot (V_{DC} + V_{contact})^2 + 4 \cdot V_{AC}\sin\omega t \cdot (V_{DC} + V_{contact}) - V_{AC}^2\cos 2\omega t + V_{AC}^2]$$

Now it is clear that a $1^{st}$ and $2^{nd}$ harmonic term appear: sin (wt) and cos (2 wt). The first harmonic term only appears if the contact potential is cancelled by an applied DC voltage or if both Vdc=0 and Vcontact=0. In other words, we can only see the first harmonic AC frequency in the readback signal and/or capacitive signal if there is a DC voltage or a contact potential between slider and disk—hence the existing contact potential linearizes our input/output relation.

The electrostatic excitation of the vibrations of slider 230 is used in pre-contact detection between slider 230 and disk 115 as will be discussed in greater detail below.

Active damping of the vibrations of slider 230 can be achieved by using phase shifter 430 to put the signal from AC signal generator 425 out of phase with the modulation amplitude signal received by signal processor 410. This effectively cancels the air bearing vibrations of slider 230. In FIG. 4, the output of phase-shifter 430 is electrically coupled with the input of the optional DC (Direct Current) amplifier 435. It is noted that in other embodiments of the present invention phase shifter 430 is located elsewhere in signal processor 410 and it outputs a phase-shifted version of its input signal. In one embodiment, a separate phase-shifter 430 is not needed and is therefore not included in signal processor 410. In the embodiment of FIG. 4, the output of phase shifter 430 is sent to TFC heating element 310 and/or antenna element 320 via feedback line 450.

In one embodiment of the present invention AC signal generator 425 also incorporates a variable gain amplifier. Thus, the output of AC signal generator 425 is an amplitude adjusted version of its input signal. The amplitude adjustment can result in amplification or attenuation, depending on the configuration of phase shifter 430, the strength of modulation amplitude signal from amplitude sensing device 411, or other requirements of the output signal. In one embodiment of the present invention illustrated in FIG. 4, the output of signal processor 410 is an amplitude adjusted vibration signal which comprises a phase shift. The amplitude adjusted vibration signal output from signal processor 410 is coupled with TFC heating element 310 and/or antenna element 320 via feedback line 450. In this way, as the amplitude in the air bearing vibrations of slider 230 increases, a larger voltage can be applied to TFC heating element 310 that will cause a greater attraction between slider 230 and disk 115 which is out of phase with the detected vibrations. The use of a variable gain amplifier in AC signal generator 425 allows the contact potential to be adjusted. In one embodiment, the voltage output from AC signal generator 425 will be nearly sinusoidal, and in the frequency range of the vibrations of the air bearing range vibrations of slider 230.

In the embodiment of the present invention shown in FIG. 4, system 400 further comprises a DC amplifier 435. DC amplifier 435 generates a DC voltage which is sent to TFC heating element 310 via line 455. It is noted that the DC voltage generated by DC amplifier 435 is separate from the AC signal sent to TFC heating element 310 from signal processor 410. Typically, the DC voltage from DC amplifier 435 is coupled with TFC heating element 310 and is used to control the fly height of slider 230 relative to disk 115. In another embodiment, a separate DC offset voltage from DC amplifier 435 is coupled with slider body 302 (e.g., with the read element, or write element of read/write head 301) and is used to provide a DC offset voltage.

In embodiments of the present invention, system 400 can be used to either electrostatically excite or dampen air bearing vibrations of slider 230. For example, when the AC signal generated by signal processor 410 is out of phase with the amplitude to the air bearing vibrations of slider 230, system 400 is used as a phase locked loop to actively dampen the vibrations. In other words, the increased voltage caused by the addition of an AC signal applied to TFC heating element 310 and/or antenna element 320 causes a greater attractive force between slider 230 and disk 115. As discussed above, the frequency of the AC signal sent from signal processor 410 is below the time constant needed by TFC heating element 310 to actively cause a change in the fly height of slider 230 due to heating of TFC heating element 310. However, the AC signal sent from signal processor 410 will electrostatically couple TFC heating element 310, slider body 302 and disk 115. This electrostatic coupling is sufficient to cause a change in the amplitude of the air bearing vibrations of slider 230 due to the increased contact potential caused by the AC signal. When this occurs out of phase with the air bearing vibration nodes of slider 230, the vibration of slider 230 is modulated and can be reduced or effectively eliminated in some cases. In the absence of active damping of the air bearing vibrations, reduced magnetic spacing and intermittent contacts between slider 230 and disk 115 can occur.

In another embodiment, the AC signal generated by signal processor 410 is in phase with the air bearing vibrations exhibited by slider 230. When this occurs, the amplitude of the air bearing vibrations is increased due to the greater attractive force between slider 230 and disk 115. In embodiments of the present invention, excitation of the air bearing vibrations can be used for pre-contact detection between slider 230 and disk 115 as discussed below with reference to FIGS. 5A, 5B, 6A, 6B, 7 and 8.

Figure 5A:
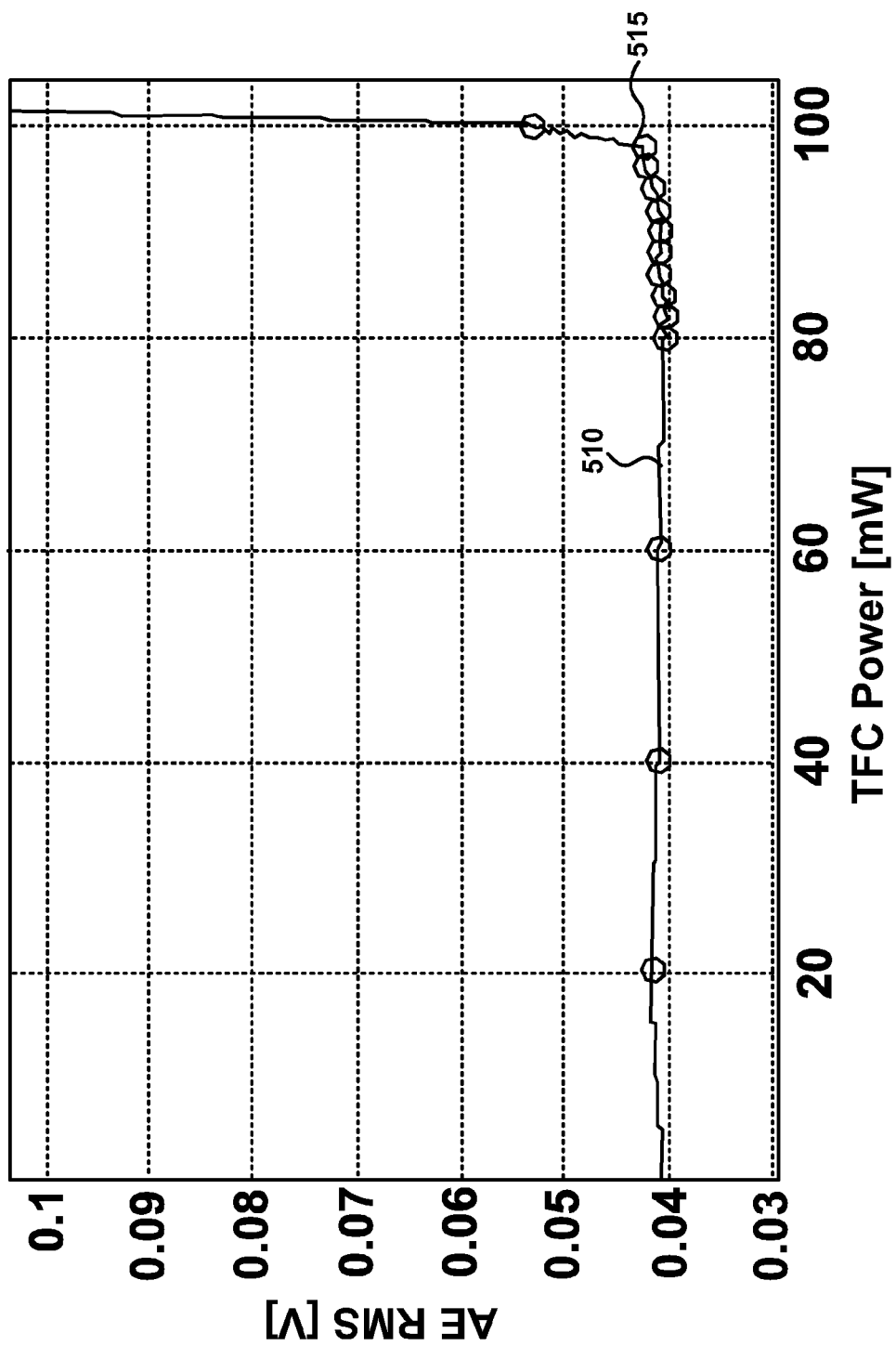
FIG. 5A is an example graph showing acoustic emissions of a slider body contacting a hard disk without an alternating current signal applied.

FIG. 5A is an example graph showing acoustic emissions of a slider body contacting a hard disk without an alternating current signal applied. In FIG. 5A, a plotline 510 having acoustic emissions on the Y-axis and power supplied to TFC heating element 310 on the X-axis. As shown in FIG. 5A, as DC power supplied to TFC heating element 310 is increased, the growth in acoustic emissions exhibited by slider 230 shows little growth (e.g., a small positive slope) until point 515 (e.g., approximately 98 milliwatts). This is, in part, due to the fact that while slider 230 is flying above disk 115, there are few acoustic emissions produced by slider 230 due to the relative stability of slider 230. At point 515, slider 230 has come into contact with disk 115. At this point, acoustic emissions increase dramatically as slider 230 and suspension arm 127 begin vibrating due to the contact between slider 230 and disk 115.

Figure 5B:
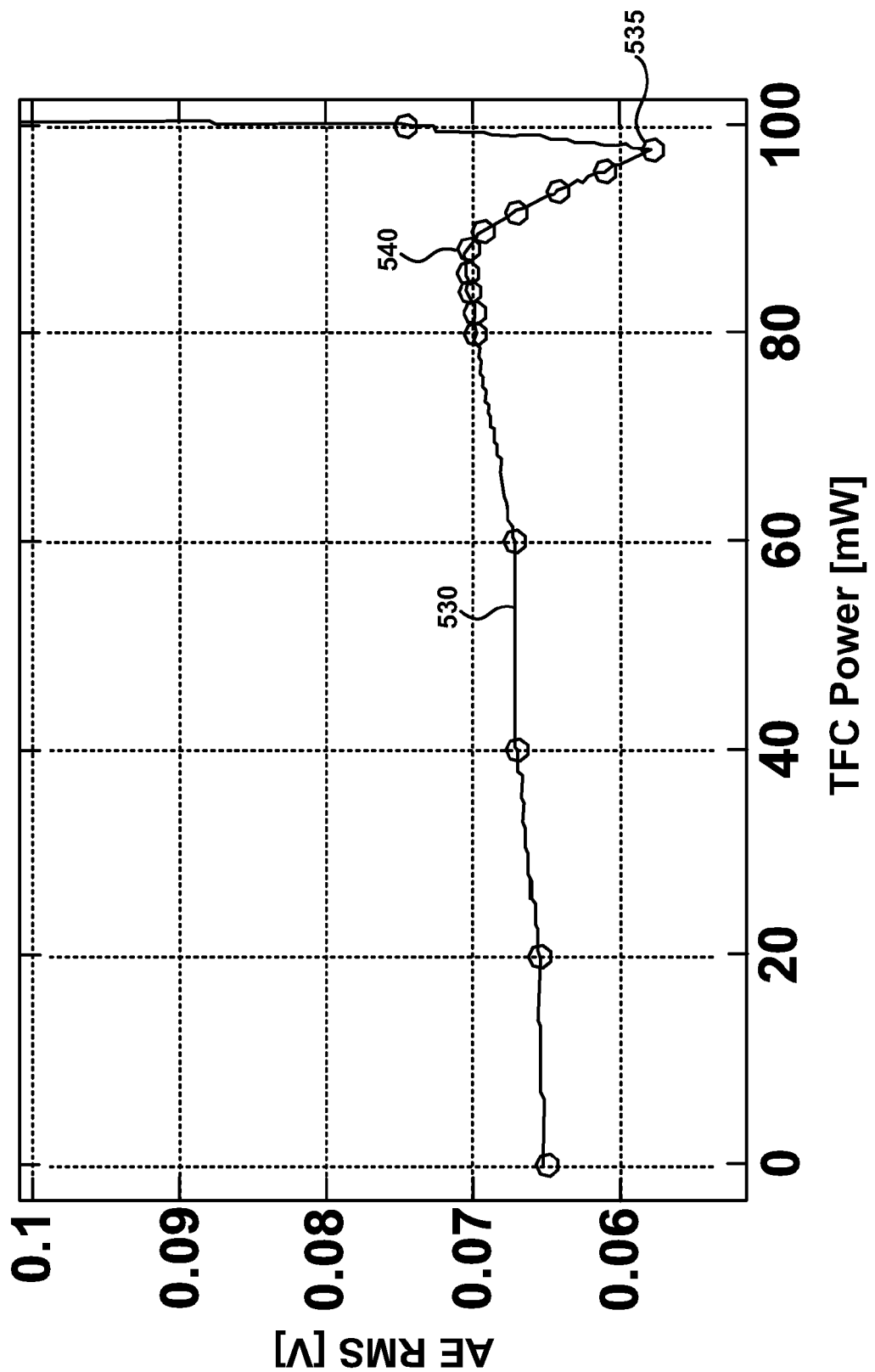
FIG. 5B is an example graph showing acoustic emissions of a slider body contacting a hard disk with an alternating current signal applied in accordance with one embodiment of the present invention.

FIG. 5B is an example graph showing acoustic emissions of a slider body contacting a hard disk with an alternating current signal applied in accordance with one embodiment of the present invention. In contrast with FIG. 5A, in FIG. 5B an AC signal is being applied to slider 230 using TFC heating element 310 in a capacitive circuit. Again, acoustic emissions are plotted on the Y-axis of FIG. 5B and DC power supplied to TFC heating element 310 is plotted on the X-axis. As shown by plotline 530, acoustic emissions of slider 230 are at higher level relative to those shown in FIG. 5A. This is, in part, due to the excitation of the air bearing vibrations of slider 230 due to the AC signal generated by signal processor 410 being in phase with the feedback signal from slider 230. In other words, the addition of the AC signal is being used to amplify the amplitude of the air bearing vibrations of slider 230.

Again, plotline 530 shows little growth (e.g., a small positive slope) as power supplied to TFC heating element 310 is increased. In contrast with FIG. 5A, at point 540 (e.g., approximately 87 milliwatts) the slope of plotline 530 levels off and then begins to take on a negative slope until point 535 when contact between slider 230 and disk 115 occurs. As in FIG. 5A, at point 535 of FIG. 5B slider 230 comes into contact with disk 115 when approximately 98 milliwatts have been supplied to slider 230. The reduction of emissions from slider 230 beginning at point 540 is because disk 115 begins limiting the amplitude of the air bearing vibrations of slider 230 as is comes closer to disk 115. This is phenomenon is known as non-linear stiffness. The result of non-linear stiffness is that stiffness of suspension somewhat stronger on one side of suspension arm 127 and somewhat weaker on the other.

In embodiments of the present invention, the detection of the reduced amplitude of the air bearing vibrations of slider 230 are used by pre-contact detector 420 to identify a pre-contact condition between slider 230 and disk 115. In embodiments of the present invention, amplitude sensing device 411 outputs a modulation amplitude signal which indicates the air bearing vibrations of slider 230. In one embodiment, pre-contact detector 420 identifies a pre-contact condition when the amplitude of the modulation amplitude signal from amplitude sensing device 411 transitions from a positive value to a zero slope. It is appreciated that in one embodiment, the exhibition of a zero slope will occur within a given voltage range (e.g., from 70 to 90 milliwatts) to prevent erroneously identifying a pre-contact event. For example, in the range between 40 and 60 milliwatts, the slope of plotline 530 exhibits a zero slope. However, it is not until approximately 98 milliwatts have been supplied to slider 230 that contact actually occurs with disk 115. In another embodiment, pre-contact detector 420 identifies a pre-contact condition when plotline 530 exhibits a negative slope (e.g., between 87 and 98 milliwatts). It is further noted that the use of plotline 530 is for purposes of illustration and that embodiments of the present invention are not limited to using a plotline of a graph for determining a pre-contact condition between slider 230 and disk 115. In general, pre-contact detector 420 identifies a pre-contact condition when it determines that the amplitude of air bearing vibrations of slider 230 decreases or remains constant as power supplied to slider 230 is increased.

Figure 6A:
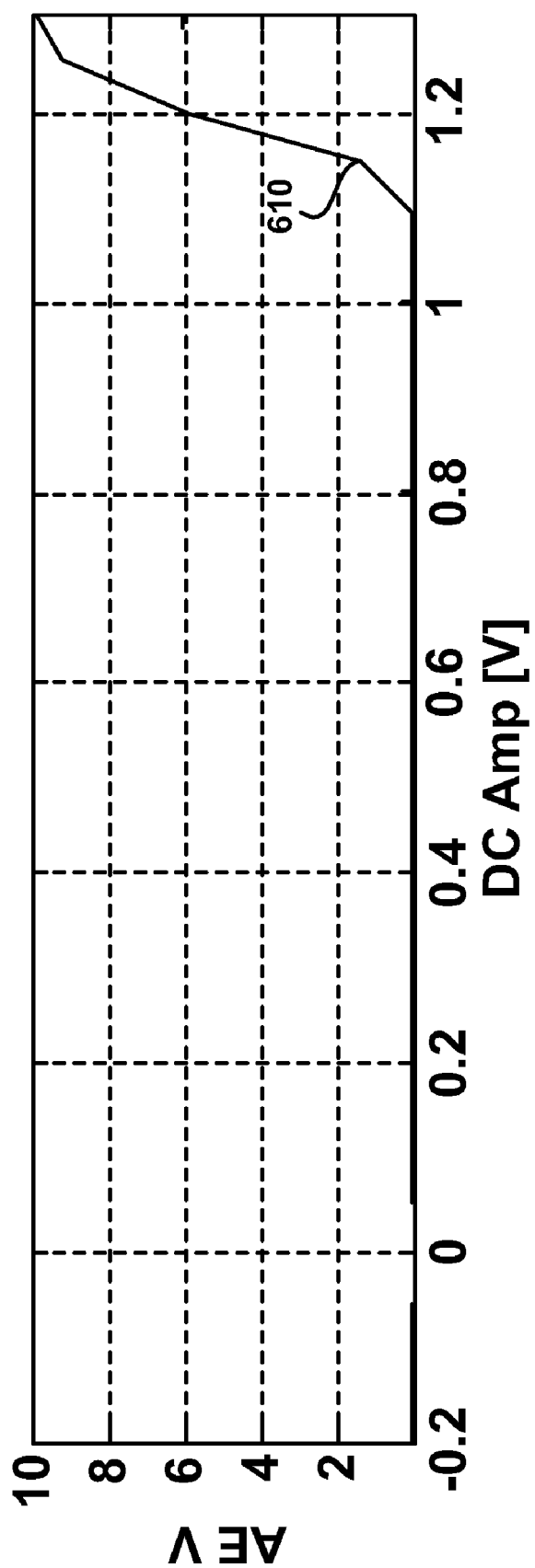
FIGS. 6A and 6B show graphs of slider displacement versus voltage to determine a pre-contact condition in accordance with an embodiment of the present invention.
Figure 6B:
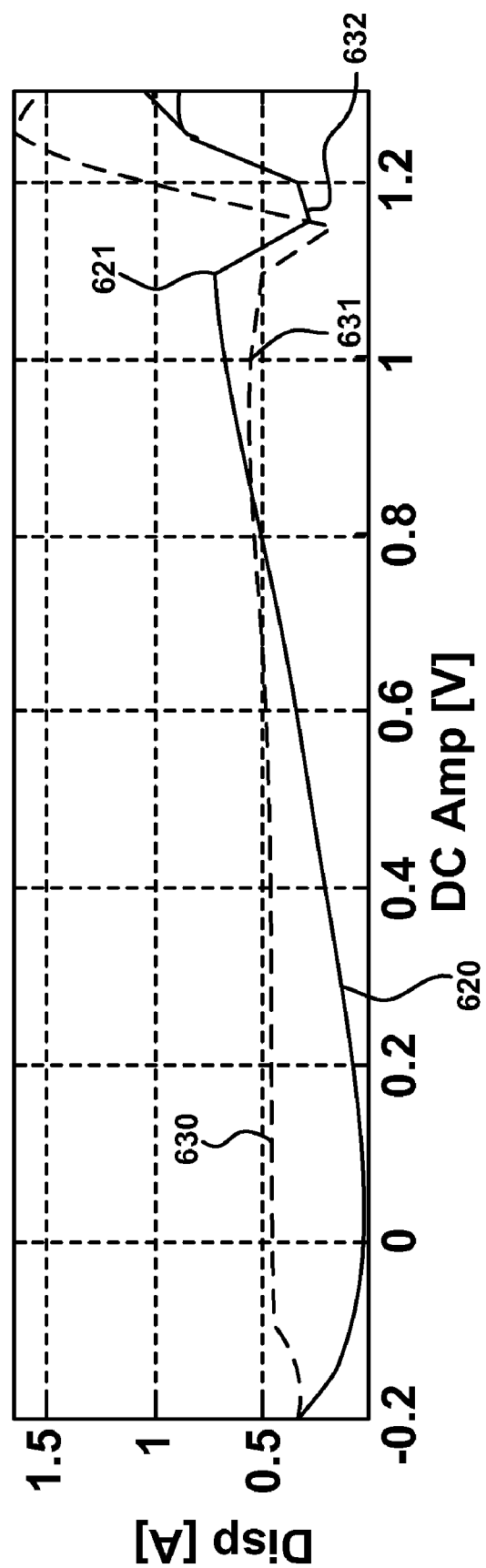

FIGS. 6A and 6B show graphs of slider displacement versus voltage to determine a pre-contact condition in accordance with an embodiment of the present invention. FIG. 6A again shows a plotline in which acoustic emissions are plotted on the Y-axis and voltage supplied to TFC heating element 310 are plotted on the X-axis. FIG. 6A shows the acoustic emissions from slider 230 when no AC signal is supplied to TFC heating element 230 in accordance with embodiments of the present invention.

FIG. 6B shows plotlines of a first harmonic (e.g., 620) and a second harmonic (e.g., 630) of slider 230. In FIG. 6B, displacement of slider 230, as measured by a Laser Doppler Vibrometer, is plotted on the Y-axis and the DC voltage supplied to TFC heating element 310 is plotted on the X-axis. It is again noted that the displacement of slider 230 can also be determined using a magneto-resistive sensing device or a capacitive sensing device in accordance with embodiments of the present invention. In FIG. 6B, both of plotlines 620 and 630 show little growth (e.g., a small positive slope) as DC power supplied to TFC heating element 310 is increased. With reference to plotline 620 (e.g., the first harmonic), at point 621 the displacement of slider 230 (e.g., the amplitude of the air bearing vibrations) decreases. Again, this is due to non-linear stiffness as slider 230 approaches disk 115 due to increased DC voltage supplied to TFC heating element 310. Again, pre-contact determiner 420 is configured to use this transition in the amplitude of air bearing vibrations of slider 230 in response to an increase of the DC power supplied to TFC heating element 310 as a pre-contact condition.

Similarly, plotline 630 (e.g., the second harmonic) shows little growth (e.g., a small positive slope) as DC power supplied to TFC heating element 310 is increased. However, at point 631, the displacement of slider 230 (e.g., the amplitude of the air bearing vibrations) decreases. Again, this is due to non-linear stiffness as slider 230 approaches disk 115 due to increased DC voltage supplied to TFC heating element 310. Again, pre-contact determiner 420 is configured to use this transition in the amplitude of the air bearing vibrations of slider 230 in response to an increase of the DC power supplied to TFC heating element 310 as a pre-contact condition.

The use of a pre-contact detection method in accordance with embodiments of the present invention is useful in calibrating the fly height of slider 230 relative to disk 115 without the necessity of actually bringing slider 230 into contact with disk 115. Contact between slider 230 and disk 115 can cause damage to either component. For example, burnishing of slider 230 and carbon wear can occur as a result of contact with disk 115. This poses a reliability problem in terms of corrosion and head amplitude degradation. However, embodiments of the present invention can detect the pre-contact conditions based upon the amplitude of air bearing vibrations of slider 230.

Figure 7:
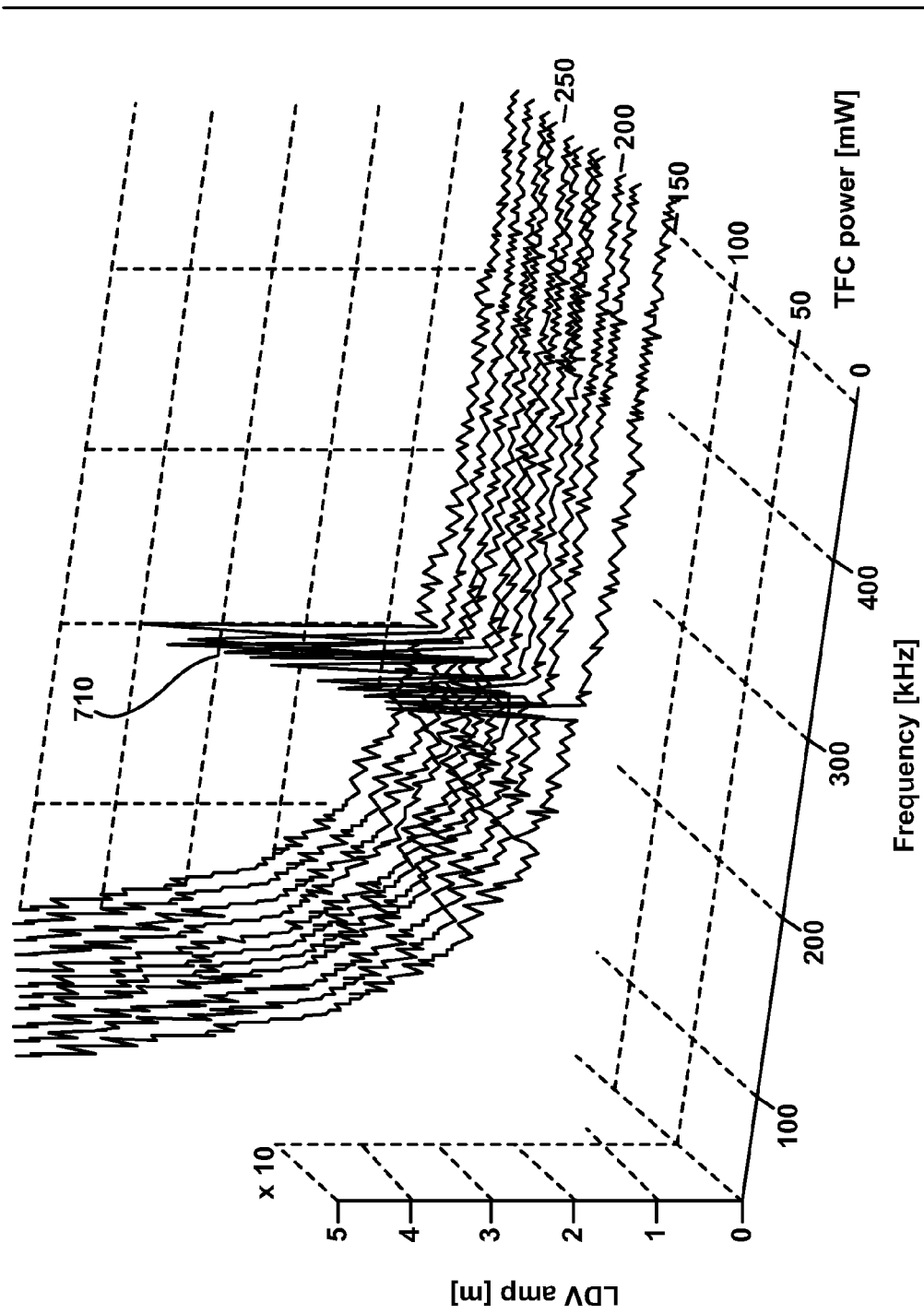
FIG. 7 shows a plot of slider displacement versus voltage and frequency without active damping.

FIG. 7 shows a plot of slider displacement versus voltage and frequency without active damping. In FIG. 7, DC power supplied to TFC heating element is plotted on the X-axis, frequency of the Pitch 2 mode vibrations of slider 230 are plotted on the Y-axis, and the amplitude of the Pitch 2 mode vibrations of slider 230 are plotted on the Z-axis. In FIG. 7, an AC signal is being supplied to TFC heating element 310 in accordance with an embodiment of the present invention. More specifically, the AC signal is in phase with the air bearing vibrations (e.g., the Pitch 2 mode vibrations) of slider 230 and increase as additional DC power is supplied to TFC heating element 310. As shown in FIG. 7, the amplitude (710) of the Pitch 2 mode vibrations of slider 230 are increasing as additional DC power is supplied to TFC heating element 310.

Figure 8:
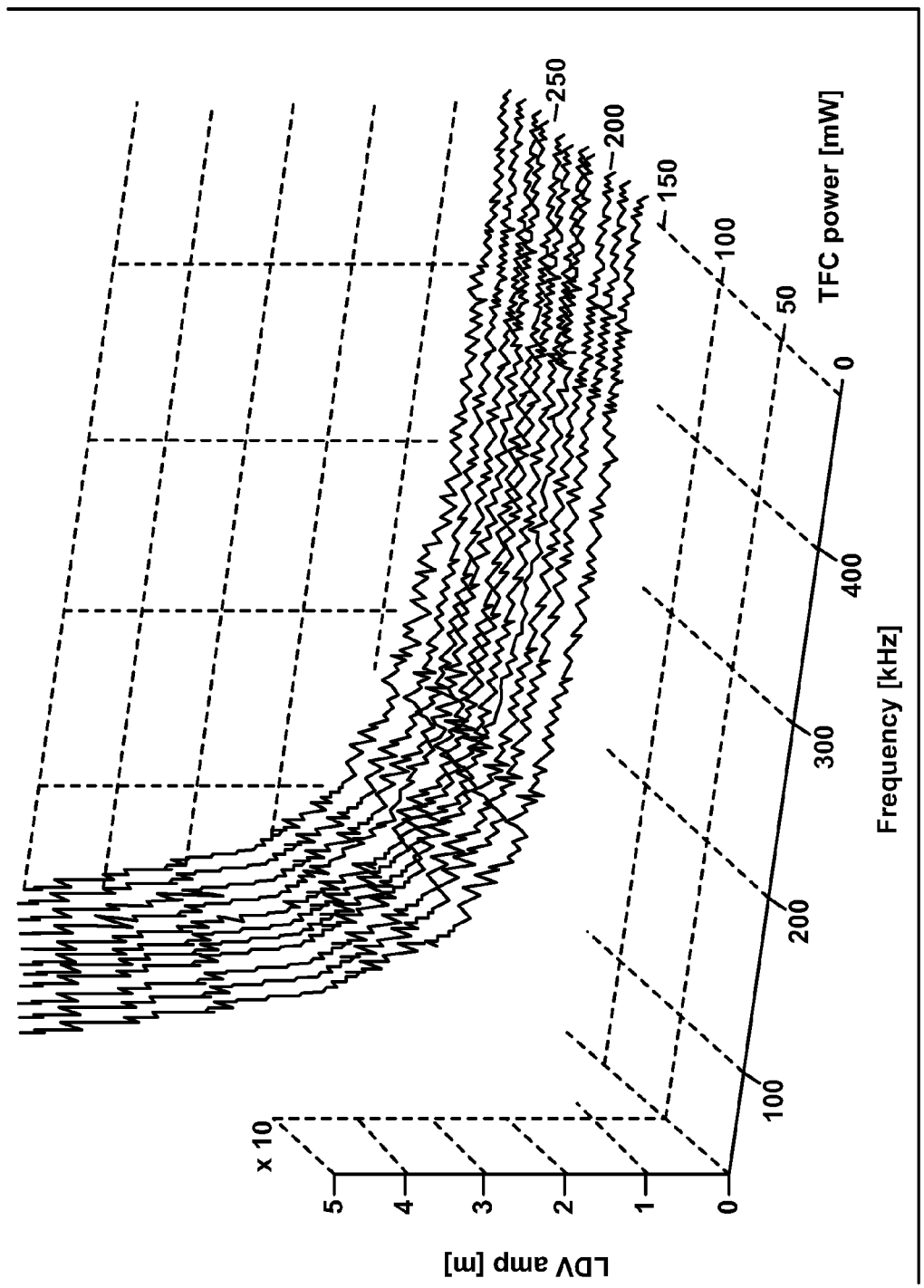
FIG. 8 shows a plot of slider displacement versus voltage and frequency with active damping in accordance with one embodiment of the present invention.

FIG. 8 shows a plot of slider displacement versus voltage and frequency with active damping in accordance with one embodiment of the present invention. In FIG. 8, DC power supplied to TFC heating element is plotted on the X-axis, frequency of the Pitch 2 mode vibrations of slider 230 are plotted on the Y-axis, and the amplitude of the air bearing vibrations of slider 230 are plotted on the Z-axis. In FIG. 7, an AC signal is being supplied to TFC heating element 310 in accordance with an embodiment of the present invention. More specifically, the AC signal is out of phase with the Pitch 2 mode vibrations of slider 230 and increase as additional DC power is supplied to TFC heating element 310. In other words, the AC signal from signal processor 410 is used to actively dampen the air bearing vibrations of slider 230 in accordance with an embodiment of the present invention. As shown in FIG. 8, slider 230 does not exhibit the Pitch 2 mode vibrations (e.g., 710 of FIG. 7) when active damping is implemented using TFC heating element 310 in a capacitive circuit.

Figure 9:
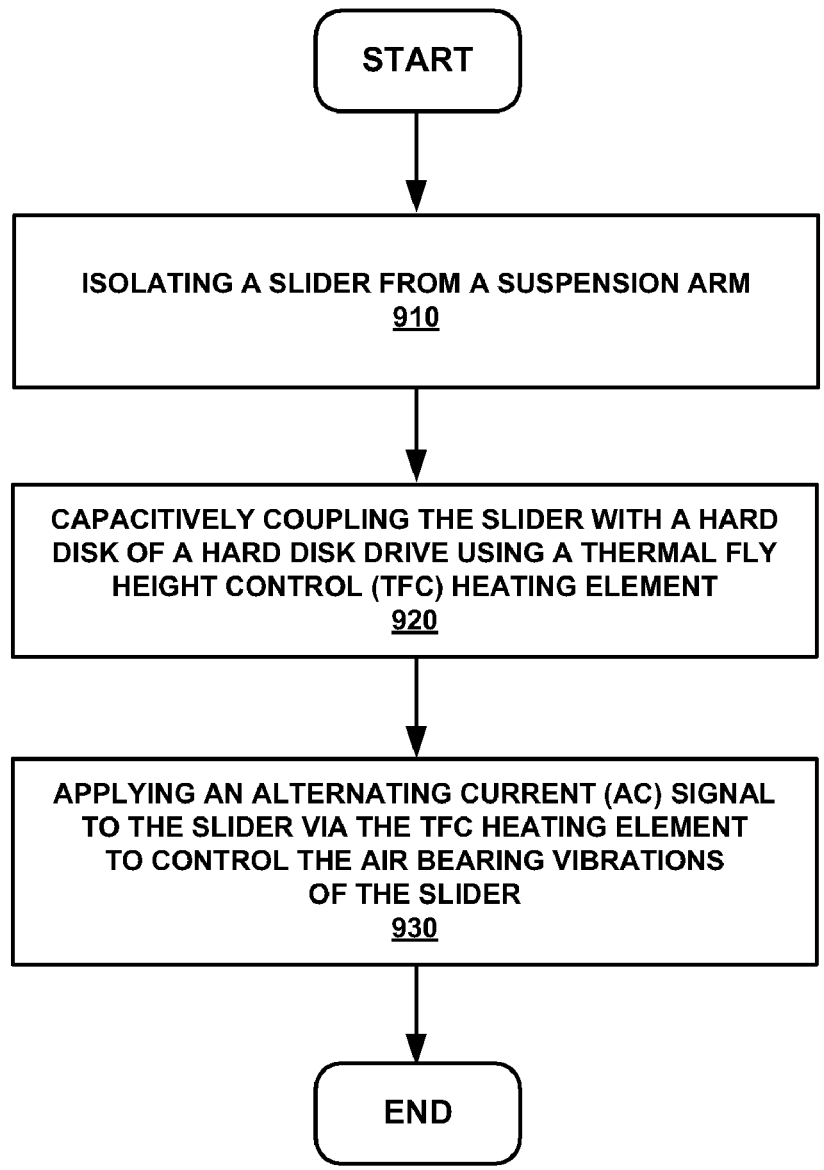
FIG. 9 shows a flowchart of pre-contact detection and active damping of air bearing vibrations in a hard disk drive, in accordance with one embodiment of the present invention.

FIG. 9 is a flowchart of a method 900 of pre-contact detection and active damping of air bearing vibrations in a hard disk drive in accordance with an embodiment of the present invention. In operation 910 of FIG. 9, a slider is isolated from a suspension arm. As described above with reference to FIG. 2, suspension 127 is electrically isolated from slider 230 due to the high impedance exhibited by connection 231. This facilitates creating a capacitive circuit using TFC heating element 310, slider body 302, and disk 115. Due to the high impedance of connection 231, AC power supplied to TFC heating element 310 cannot dissipate via suspension 127.

In operation 920 of FIG. 9, a slider is capacitively coupled with a hard disk of a hard disk drive using a thermal fly height control (TFC) heating element. As described above with reference to FIGS. 3A, 3B, 3C, and FIG. 10, a capacitive circuit is created using TFC heating element 310. More specifically, a first capacitive coupling comprising TFC heating element 310 and slider body 302 is created. Due to the insulating properties of the material of read/write head 301 which surround TFC heating element 310, a first capacitive coupling (e.g., 1005 of FIG. 10) is created. Additionally, a second capacitive coupling (e.g., 1010 of FIG. 10) is created due to the air gap between slider body 302 and disk 115. In embodiments of the present invention, the first capacitive coupling (e.g., 1005) and the second capacitive coupling (e.g., 1010) comprise a capacitive circuit.

In operation 930 of FIG. 9, an alternating current (AC) signal is applied to the slider via the TFC heating element to control the air bearing vibrations of the slider. As described above with reference to FIGS. 4, 5A, 5B, 6A, 6B, 7, and 8, an alternating current is generated by AC signal generator 425. However, the AC signal is sent via the same line which supplies DC current to the TFC heating element. It is again noted that the AC signal is separate from other signals sent to slider 230 such as a DC voltage to TFC heating element 310 or to slider body 302. As described above, the AC signal is used in accordance with the present invention to detect a pre-contact condition between slider 230 and disk 115. Additionally, the AC signal can be used in accordance with the present invention to dampen the air bearing vibrations (e.g., the Pitch 2 mode vibrations) of slider 230. Furthermore, the AC signal can be used for active stiffening of suspension 127 in accordance with embodiments of the present invention.

The alternative embodiments of the present invention are thus described. While the present invention has been described in particular embodiments, it should be appreciated that the present invention should not be construed as limited by such embodiments, but rather construed according to the below claims.

What is claimed is:

1. A method of pre-contact detection and active damping of air bearing vibrations in a hard disk drive, said method comprising:
   isolating a slider from a suspension arm;
   capacitively coupling said slider with a hard disk of said hard disk drive using a thermal fly-height control (TFC) heating element; and
   applying an alternating current (AC) signal to said slider via said TFC heating element to control the air bearing vibrations of said slider.

2. The method as recited in claim 1 further comprising:
   determining a frequency of the air bearing vibrations of said slider; and
   modulating said AC signal in proportion to said frequency.

3. The method as recited in claim 2 further comprising:
   phase-shifting said AC signal to actively dampen the air bearing vibrations of said slider.

4. The method of claim 2 further comprising,
   generating an amplitude signal based upon a readback signal of the amplitude of said slider.

5. The method as recited in claim 4 wherein said generating said amplitude signal further comprises:
   utilizing a sensor selected from the group consisting of: a capacitive sensing device and a magneto resistive (MR) sensing device to generate said amplitude signal.

6. The method as recited in claim 4 further comprising:
   determining that said read back amplitude signal does not increase as said DC offset is increased; and
   identifying a pre-contact condition between said slider and said hard disk in response to said determining that said read back amplitude signal does not increase as said DC offset is increased.

7. The method as recited in claim 1 further comprising:
   applying a DC (direct current) offset voltage to said slider.

8. The method as recited in claim 1 wherein said capacitively coupling said slider with said hard disk further comprises:
   creating a first capacitive coupling between said TFC heating element and said slider; and
   creating a second capacitive coupling between said slider and said hard disk.

9. The method as recited in claim 8 wherein creating said first capacitive coupling further comprises:
   electrically coupling an antenna element with said TFC heating element; and
   disposing said antenna element proximate to said slider.

10. The method as recited in claim 9 further comprising:
    using a capacitor as said antenna element to increase said first capacitive coupling between said TFC heating element and said slider.

11. The method as recited in claim 8 further comprising:
    utilizing a layer of high dielectric material disposed proximate to said slider body to increase said first capacitive coupling.

12. A system for pre-contact detection and active damping of air bearing vibrations in a hard disk drive, said system comprising:
- a housing;
- a disk pack mounted to said housing and comprising at least one hard disk that is rotatable relative to said housing, the disk pack defining an axis of rotation and a radial direction relative to the axis;
- at least one actuator mounted to said housing and being movable relative to said disk pack;
- a slider coupled with said actuator via a high-impedance coupling, said slider comprising a slider body and a head configured to read data from and write data to said at least one hard disk and a thermal fly-height control (TFC) heating element disposed within said head; and
- a signal processor coupled with said TFC heating element and said hard disk and configured to apply an alternating current (AC) signal to said slider body via said TFC heating element to control the air bearing vibrations of said slider.

13. The system of claim 12 wherein said signal processor is coupled with a capacitive circuit comprising:
- a first capacitive coupling comprising said TFC heating element and said slider body;
- a second capacitive coupling comprising said slider body and said hard disk.

14. The system of claim 13 further comprising:
- a layer of high dielectric material disposed proximate to said slider body and configured to increase said first capacitive coupling.

15. The system of claim 12 wherein said first capacitive coupling further comprises:
- an antenna element coupled with said TFC heating element and disposed proximate to said slider body.

16. The system of claim 14 wherein said antenna element comprises a capacitor.

17. The system of claim 12 wherein said signal processor further comprises:
- an alternating current signal generator configured to generate said AC signal in proportion to a frequency of the air bearing vibrations of said slider.

18. The system of claim 16 wherein said signal processor further comprises:
- a phase shifter configured to shift the phase of said AC signal to actively dampen the air bearing vibrations of said slider.

19. The system of claim 12 wherein said system further comprises:
- a direct current (DC) amplifier configured to generate a DC voltage to said slider.

20. The system of claim 18 wherein said signal processor further comprises:
- a signal amplitude sensing device configured to generate an amplitude signal based upon a readback signal of the amplitude of said slider.

21. The system of claim 19 wherein said signal amplitude sensing device is selected from the group consisting of: a capacitive sensing device and a magneto resistive (MR) sensing device.

22. The system of claim 19 wherein said signal processor further comprises:
- a pre-contact detector configured to identify a pre-contact condition between said slider and said hard disk in response to determining that said amplitude signal does not increase as a power supplied to said slider is increased.

23. The system of claim 22 further comprising:
- a thermal fly-height control (TFC) heating element disposed within said head and wherein the AC signal is conveyed to said antenna element via said TFC heating element.

24. The system of claim 23 further comprising:
- a layer of high dielectric material disposed proximate to said slider body and configured to increase a capacitive coupling between said antenna element and said slider body.

25. A system for pre-contact detection and active damping of air bearing vibrations in a hard disk drive, said system comprising:
- a housing;
- a disk pack mounted to said housing and comprising at least one hard disk that is rotatable relative to said housing, the disk pack defining an axis of rotation and a radial direction relative to the axis;
- at least one actuator mounted to said housing and being movable relative to said disk pack;
- a slider coupled with said actuator via a high-impedance coupling, said slider comprising a slider body and a head configured to read data from and write data to said at least one hard disk; and
- a signal processor coupled with said antenna element and said hard disk and configured to apply an alternating current (AC) signal to said slider body via an antenna element disposed within said head and proximate to said slider body.

* * * * *